US010260395B2

(12) United States Patent
Li et al.

(10) Patent No.: US 10,260,395 B2
(45) Date of Patent: Apr. 16, 2019

(54) NITROUS OXIDE REMOVAL CATALYSTS FOR EXHAUST SYSTEMS

(71) Applicant: BASF Corporation, Florham Park, NJ (US)

(72) Inventors: Yuejin Li, Edison, NJ (US); Xiaolai Zheng, Princeton Junction, NJ (US); Stanley A. Roth, Yardley, PA (US); Olga Gerlach, Ludwigshafen (DE); Andreas Sundermann, Bensheim (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/738,879

(22) PCT Filed: Jun. 30, 2016

(86) PCT No.: PCT/US2016/040485
§ 371 (c)(1),
(2) Date: Dec. 21, 2017

(87) PCT Pub. No.: WO2017/004414
PCT Pub. Date: Jan. 5, 2017

(65) Prior Publication Data
US 2018/0195425 A1 Jul. 12, 2018

Related U.S. Application Data
(60) Provisional application No. 62/187,590, filed on Jul. 1, 2015.

(51) Int. Cl.
| | | |
|---|---|---|
| *F01N 3/20* | (2006.01) | |
| *B01D 53/94* | (2006.01) | |
| *B01J 35/00* | (2006.01) | |
| *B01J 37/00* | (2006.01) | |
| *B01J 37/02* | (2006.01) | |
| *B01J 37/08* | (2006.01) | |
| *B01J 23/00* | (2006.01) | |
| *B01J 23/63* | (2006.01) | |
| *B01J 23/66* | (2006.01) | |
| *B01J 23/89* | (2006.01) | |
| *B01J 23/44* | (2006.01) | |
| *B01J 23/46* | (2006.01) | |
| *B01J 35/10* | (2006.01) | |

(52) U.S. Cl.
CPC ......... *F01N 3/208* (2013.01); *B01D 53/9404* (2013.01); *B01D 53/9418* (2013.01); *B01D 53/9427* (2013.01); *B01D 53/9477* (2013.01); *B01J 23/002* (2013.01); *B01J 23/63* (2013.01); *B01J 23/66* (2013.01); *B01J 23/894* (2013.01); *B01J 35/0006* (2013.01); *B01J 35/0026* (2013.01); *B01J 37/0018* (2013.01); *B01J 37/0201* (2013.01); *B01J 37/0205* (2013.01); *B01J 37/082* (2013.01); *B01J 37/088* (2013.01); *B01D 53/9445* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1028* (2013.01); *B01D 2255/207* (2013.01); *B01D 2255/2063* (2013.01); *B01D 2255/2065* (2013.01); *B01D 2255/2068* (2013.01); *B01D 2255/20715* (2013.01); *B01D 2255/9202* (2013.01); *B01D 2255/9207* (2013.01); *B01D 2257/402* (2013.01); *B01D 2258/012* (2013.01); *B01J 23/44* (2013.01); *B01J 23/464* (2013.01); *B01J 35/002* (2013.01); *B01J 35/1014* (2013.01); *B01J 35/1038* (2013.01); *B01J 2523/00* (2013.01); *Y02C 20/10* (2013.01); *Y02T 10/22* (2013.01); *Y02T 10/24* (2013.01)

(58) Field of Classification Search
CPC .. B01D 53/56; B01D 53/565; B01D 53/8628; B01D 53/9413; B01D 53/9427; B01D 2255/102; B01D 2255/2065; B01D 2255/407; B01D 2257/402; B01D 2258/01; B01D 2258/012; B01J 21/066; B01J 23/10; B01J 23/40; B01J 23/894; F01N 3/2066; F01N 3/2803; F01N 13/16; F01N 2330/00; F01N 2330/18; F01N 2570/145
See application file for complete search history.

(56) References Cited

U.S. PATENT DOCUMENTS

| | | | |
|---|---|---|---|
| 6,387,338 B1 * | 5/2002 | Anatoly | B01D 53/8628 423/239.1 |
| 7,976,804 B2 | 7/2011 | Jantsch et al. | |

(Continued)

*Primary Examiner* — Timothy C Vanoy
(74) *Attorney, Agent, or Firm* — Baltazar Gomez

(57) ABSTRACT

A nitrous oxide ($N_2O$) removal catalyst composite is described, which includes: a $N_2O$ removal catalytic material on a carrier, wherein the catalytic material comprises a platinum group metal (PGM) component on a ceria-containing support having a single phase, cubic fluorite crystal structure. The catalytic material is effective to decompose nitrous oxide ($N_2O$) to nitrogen ($N_2$) and oxygen ($O_2$) and/or to reduce $N_2O$ to $N_2$ and water ($H_2O$) and/or ($CO_2$) under conditions of an exhaust stream of an internal combustion engine operating under conditions that are stoichiometric or lean with periodic rich transient excursions. Methods of making and using the same are also provided.

25 Claims, 25 Drawing Sheets

(56) References Cited

U.S. PATENT DOCUMENTS

| | | | |
|---|---|---|---|
| 8,778,831 B2* | 7/2014 | Southward | B01D 53/944 |
| | | | 423/239.1 |
| 8,992,870 B2 | 3/2015 | Nirisen et al. | |
| 2009/0191108 A1 | 7/2009 | Blanchard et al. | |
| 2009/0246109 A1* | 10/2009 | Southward | B01D 53/9409 |
| | | | 423/239.1 |
| 2011/0209459 A1 | 9/2011 | Hancu et al. | |
| 2013/0028818 A1* | 1/2013 | Eckhoff | F01N 3/0814 |
| | | | 423/212 |

* cited by examiner

NITROUS OXIDE REMOVAL CATALYSTS FOR EXHAUST SYSTEMS

CROSS-REFERENCE TO RELATED APPLICATIONS

This application is a U.S. National Stage of International Patent Application PCT/US2016/040485, filed Jun. 30, 2016, which claims priority from U.S. Provisional Application No. 62/187,590, filed Jul. 1, 2015. The disclosures of each of the applications noted above are incorporated herein by reference in their entirety.

TECHNICAL FIELD OF THE INVENTION

The present invention is directed to a purifying catalyst for exhaust systems of internal combustion engines operating in stoichiometric conditions or lean conditions with periodic rich transient excursions, and methods for its use. More particularly, the invention pertains to a catalyst comprising a platinum group metal (PGM) such as a rhodium (Rh) component, a palladium (Pd) component, and/or a platinum (Pt) component supported on a ceria-containing support, wherein the catalyst is effective to remove nitrous oxide ($N_2O$) present in an exhaust stream of an internal combustion engines. For example, the $N_2O$ removal catalyst is effective to decompose $N_2O$ to nitrogen ($N_2$) and oxygen ($O_2$) and/or to reduce $N_2O$ to nitrogen and water and/or carbon dioxide, depending on the reductant being present.

BACKGROUND OF THE INVENTION

Nitrous oxide ($N_2O$) is a greenhouse gas with a global warming potential of 310 times that of $CO_2$ and an atmospheric lifetime of 114 years. Automotive exhaust is one possible source of $N_2O$ emissions, as a by-product of combustion of fuel itself as well as a by-product formed during the catalytic reduction of NOx. Recognizing its global warming potential, US EPA has already set a $N_2O$ emission limit of 10 mg/mile for light-duty vehicles over the FTP cycle starting from MY2012, and a $N_2O$ emission limit of 0.1 g/bhp-h for heavy duty vehicles over the heavy duty FTP cycle starting from MY2014. In the past, automobile catalyst systems were normally optimized for maximum reduction of NOx (a regulated pollutant) without accounting for $N_2O$ level. Now if $N_2O$ exceeds the 10 mg/mile limits, then there is a penalty against CAFE fuel economy requirements.

Currently, nitrous oxide ($N_2O$) decomposition is practiced industrially for treating the off-gases from nitric acid and adipic acid production. The temperatures for these operations are much higher (>550° C., for example ~800-900° C.) than that of typical automotive exhaust, and the process streams contain little water (<1%). There are many literature reports describing $N_2O$ decomposition catalysts, and most can be grouped into three categories: (1) supported Rh, (2) metal oxides with spinel structure and (3) ion exchanged zeolites. Such catalysts are usually in powder or pelleted form and not supported on a ceramic carrier, such as a monolithic substrate or a wall-flow filter. In DE102008048159, decomposition of $N_2O$ in a gas current is conducted with a catalyst where rhodium is supported on a gamma-alumina that is optionally doped with cerium or gold.

In KR20060019035, directed to a method for removing nitrogen oxides by using dual catalyst beds, nitrogen oxides are decomposed into nitrogen and nitrous oxide using a bed of nitrogen oxide reducing catalyst $Pt/V_X$-$P_Y$-(material containing hydroxyl group)$_Z$, and the nitrous oxide is further decomposed into nitrogen and oxide using a bed of nitrous oxide decomposing catalyst $Rh$—$Ag/CeO_2/M1$-$M2$-$M3$, where M1 is Mg, Ba or Sr, M2 is Al, Fe, V, Ga or Cr, and M3 is Zn, Ni, Cu.

WO2011036320 is directed to catalytic systems of rhodium and cerium oxide comprising an active rhodium phase supported on a mixed oxide of cerium and one or more metals selected from transition and internal transition metal groups, and a support such as alumina. WO2011036320 targets effluents that are characterized by containing diluted nitrous oxide (typically 500-5000 ppm), relatively low temperature (<525° C.), and inhibitor gases.

In U.S. Pat. No. 8,512,658 a method of depleting nitrous oxide in exhaust gas after-treatment for lean-burn internal combustion engines is provided. A $N_2O$ depletion catalyst is preferably a catalyst selected from the group consisting of a three-way catalyst, a $NO_x$ reduction catalyst, a $NO_x$ storage catalyst and an oxidation catalyst. U.S. Pat. No. 8,512,658 identifies a particular embodiment of a $N_2O$ depletion catalyst as being palladium supported on a high-surface-area metal oxide, preferably a lanthanum-stabilized aluminum oxide due to such a catalyst providing the lowest light off temperatures for the $N_2O$ reaction under $\lambda \leq 1$ conditions after aging. When the $N_2O$ depletion catalyst is below its light-off temperature, U.S. Pat. No. 8,512,658 identifies that it is advantageous to heat the catalyst.

There is a continuing need in the art to provide catalytic articles that efficiently and effectively provide removal of nitrous oxide ($N_2O$) under exhaust gas conditions.

SUMMARY OF THE INVENTION $N_2O$ is formed under transient conditions over all major classes of emission control catalysts including but not limited to Three-Way Conversion (TWC) and Four-Way Conversion (FWC) catalysts found in traditional/stoichiometric gasoline cars and gasoline direct injection (GDI) gasoline cars. In addition, $N_2O$ is formed under transient conditions over Diesel Oxidation Catalysts (DOC), Catalyzed Soot Filters (CSF), Lean NOx Trap (LNT), Selective Catalyst Reduction (SCR) and selective Ammonia Oxidation (AMOx) catalyst found in diesel vehicles. Ever more stringent regulations on $N_2O$ emissions require that the emission control system design be optimized not only for high NOx conversion performance but also for low $N_2O$ emissions. Theoretically, reduction of $N_2O$ emissions can be addressed by either minimizing the formation of $N_2O$ or by using a catalyst to convert $N_2O$ directly to $N_2$ and $O_2$ and/or to reduce $N_2O$ to $N_2$ and $H_2O$ and/or $CO_2$ (depending on the reductant). An effective $N_2O$ catalyst can potentially be provided as a stand-alone device or incorporated into existing catalyst systems.

A first aspect is a nitrous oxide ($N_2O$) removal catalyst composite for treatment of an exhaust stream of an internal combustion engine operating under conditions that are stoichiometric or lean with periodic rich transient excursions, the catalyst composite comprising: a $N_2O$ removal catalytic material on a carrier, the catalytic material comprising a platinum group metal (PGM) component supported on a ceria-containing support having a single phase, cubic fluorite crystal structure, wherein the $N_2O$ removal catalytic material is effective to decompose $N_2O$ in the exhaust steam to nitrogen ($N_2$) and oxygen ($O_2$) and/or to reduce $N_2O$ to $N_2$ and water ($H_2O$) and/or carbon dioxide ($CO_2$) under conditions of the exhaust stream.

The ceria-containing support may have a pore volume of at least 0.20 cm$^3$/g. The ceria-containing support has a BET surface area of at least 10 m$^2$/g after aging at 950° C. for 20 hours with an alternating lean and rich feed. The BET surface area of the ceria-containing support is about 10 to about 100 m$^2$/g. The ceria-containing support may comprise an x-ray diffraction (XRD) lattice parameter $a_0$ in the range of 0.517 to 0.541 nm.

The ceria-containing support may comprise a mixed metal oxide in solid solution form comprising ceria and one or more metal oxides selected from the group consisting of zirconia, praseodymia, lanthana, neodymia, yttria, samaria, and gadolinia. In a detailed embodiment, the mixed metal oxide comprise by weight: ceria in an amount of about 5% to about 95%; zirconia in an amount of about 5% to about 95%; and one or more of praseodymia, lanthana, neodymia, yttria, samaria, and gadolinia in an amount of about 0% to about 20%.

The ceria-containing support may comprise about 90 to about 100 weight % ceria and about 0-10 weight % of a promoter metal that is different from the PGM component.

The PGM component may comprises a rhodium component, a palladium component, a platinum component, or a combination thereof, wherein the PGM component is present on the ceria-containing support in an amount of about 0.01% to about 5% by weight of the ceria-containing support.

The N$_2$O removal catalyst composite may further comprise a promoter metal that is different from the PGM component in an amount of about 0.001-10 weight % of the ceria-containing support, the promoter metal comprising one or more base metals selected from the group consisting of: copper (Cu), manganese (Mn), iron (Fe), cobalt (Co), nickel (Ni), vanadium (V), chromium (Cr), zinc (Zn), and tin (Sn) and/or one or more additional platinum group metal components selected from the group consisting of: silver (Ag), iridium (Ir), gold (Au), and ruthenium (Ru).

The carrier may comprise a flow-through substrate or a wall-flow filter.

Another aspect is an emissions treatment system for treatment of an exhaust stream of an internal combustion engine operating under conditions that are stoichiometric or lean with periodic rich transient excursions, the emission treatment system comprising: an exhaust conduit in fluid communication with the internal combustion engine via an exhaust manifold; a treatment catalyst; and the N$_2$O removal catalyst composite according to any embodiment herein. The treatment catalyst may comprise a nitrogen oxides treatment catalyst, which comprises: a three-way conversion (TWC) catalyst or a lean NOx trap (LNT) or a selective catalytic reduction (SCR) catalyst. The treatment catalyst may comprise a diesel oxidation catalyst (DOC). The treatment catalyst may be located on the same carrier as the N$_2$O removal catalyst composite. For example, the treatment catalyst can be present as a layer or as a zone of the N$_2$O removal catalyst composite carrier. The emissions treatment system may further comprise a second carrier on which the treatment catalyst is located. For example, the treatment catalyst may be located on a carrier separate from the carrier of the N$_2$O removal catalyst composite.

A further aspect is a method for treating exhaust gases of an exhaust stream of an internal combustion engine operating under conditions that are stoichiometric or lean with periodic rich transient excursions comprising contacting the exhaust stream including hydrocarbons, carbon monoxide, and nitrogen oxides with the N$_2$O removal catalyst composite according to any embodiment disclosed herein. In some embodiments, the internal combustion engine operating conditions include reducing conditions for a first time duration followed by lean operating conditions for a second time duration, wherein the second time duration is at least twice as long as the first time duration, and wherein the contacting step results in conversion of at least 90% of N$_2$O in the exhaust gas stream. The N$_2$O removal catalyst composite may be at a temperature of about 200° C. to about 500° C. The N$_2$O removal catalyst composite may be at a temperature of about 400° C. or below. The first duration may be about 0.25 to about 30 seconds and the second duration may be about 1 to about 30 minutes.

In some embodiments, the N$_2$O removal catalyst composite is included in an exhaust gas treatment system comprising a lean NOx trap or a three-way conversion (TWC) catalyst, wherein the exhaust gas treatment system periodically required rich conditions for nitrogen oxides (NOx) control. In some embodiments, the N$_2$O removal catalyst composite is included in an exhaust gas treatment system comprising a diesel oxidation catalyst optionally in combination with a selective catalytic reduction catalyst, wherein the internal combustion engine operating condition include periods of rich operation of N$_2$O removal.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION OF THE INVENTION

Figure 1:
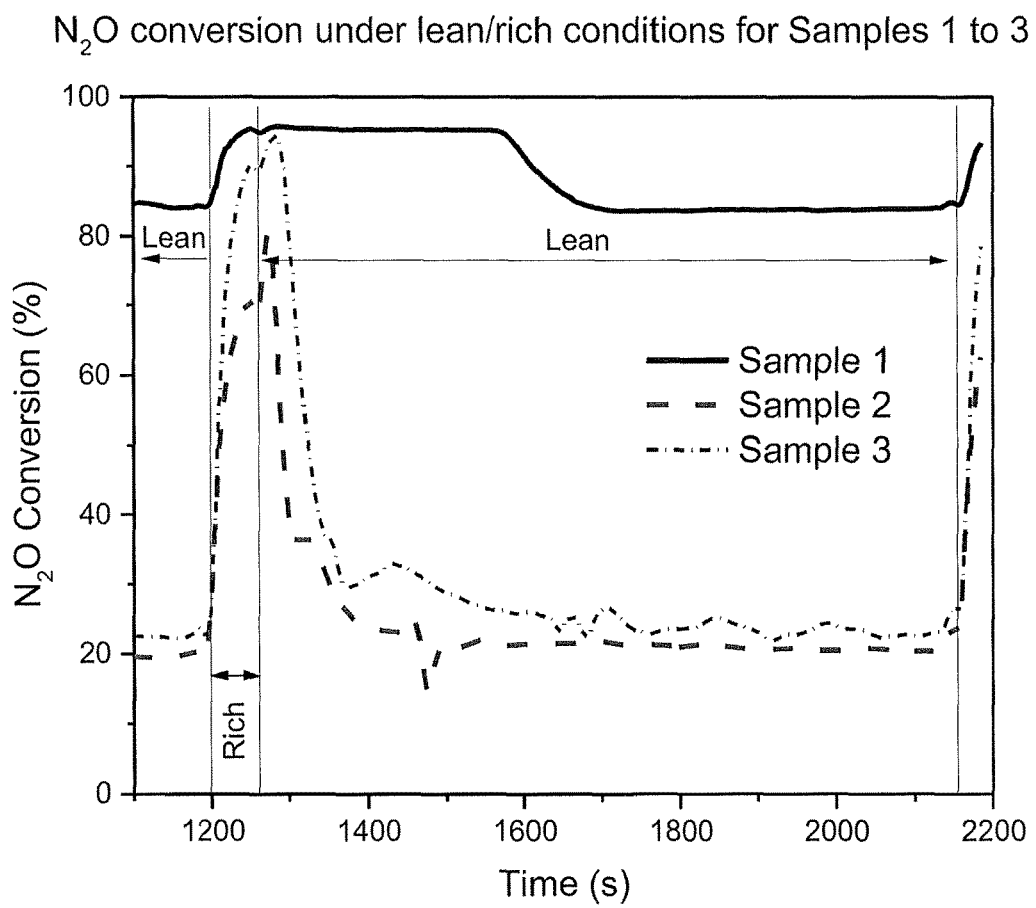
FIG. 1 is a graph showing N$_2$O conversion (%) versus time under lean/rich conditions for supported Rh catalysts Sample 1, Sample 2, and Sample 3.

Provided are nitrous oxide (N$_2$O) removal catalysts comprising a platinum group metal (PGM) component supported on a ceria-containing support that has a single phase of a cubic fluorite crystal structure. These catalysts are effective to decompose nitrous oxide (N$_2$O) to nitrogen (N$_2$) and oxygen (O$_2$) and/or to reduce N$_2$O to N$_2$ and H$_2$O and/or CO$_2$ (depending on the reductant) under many conditions, including in particular those that are: (1) stoichiometric characterized by an oscillatory air:fuel ratio, resulting in alternating conditions of slightly rich and slightly lean or (2) lean with periodic rich transient excursions. Such catalysts are particularly effective at temperatures of 400° C. or less. Suitable ceria-containing supports have a single phase, cubic fluorite crystal structure. In one or more embodiments, the ceria-containing support has a pore volume that is at least about 0.20 cm$^3$/g. One or more embodiments have a BET surface area of at least about 10 m$^2$/g after aging at about 950° C. for about 20 hours with an alternating lean and rich feed. A specific embodiment has an XRD cubic lattice parameter a$_0$ in the range of 0.517 to 0.541.

It has unexpectedly been found that at about 400° C. with only a transient rich (or reducing) exposure (about 15 seconds), N$_2$O decomposition activity reaches over 90% for more than about 8 minutes thereafter under subsequent lean (or oxidizing) conditions. The N$_2$O removal catalysts disclosed herein, therefore, are applicable under varying conditions where there is a reducing atmosphere of some duration following by an oxidizing atmosphere of another duration. As such, the duration of rich/reducing exposure may be in the range of about 0.25 to about 30 seconds. The duration of N$_2$O decomposition activity reaching over 90% conversion (or about 80% or about 70% or about 60% or even about 50%) during the subsequent lean/oxidizing conditions may be in the range of about 1 to about 30 minutes. The duration of N$_2$O decomposition activity under lean conditions may be at least about two times (i.e., twice) the duration of the rich exposure. In some embodiments, the duration of N$_2$O decomposition activity under lean conditions may be at least about ten times the duration of the rich exposure.

The conditions suitable for the N$_2$O removal catalysts disclosed herein are different from those encountered in industrial uses. That is, for the purposes of N$_2$O decomposition to treating the off-gases from nitric acid and adipic acid production, conditions are typically at temperatures of >550° C. (for example ~800-900° C.) with low H$_2$O (<1 volume %) and low O$_2$ (<1 volume %) levels. The N$_2$O removal catalysts disclosed herein are effective at temperatures of about 200° C. to about 500° C., which are lower than the previous industrial uses, and in the presence of H$_2$O and O$_2$ levels of approximately 10 volume % of each. This means that N$_2$O removal using the discussed catalysts can occur in exhaust conditions of internal combustion engines. In a preferred embodiment, N$_2$O removal catalysts in the exhaust stream are at temperatures of about 400° C. or less (e.g., about 200° C. to about 400° C.).

As such, the catalysts disclosed herein may be used in applications that have regular rich transients such as in three-way conversion (TWC) or four-way conversion (FWC) catalyst formulations or in lean NO$_x$ trap (LNT) applications for gasoline vehicles so that the N$_2$O tailpipe emission is minimized. These catalysts may be used in diesel vehicle applications where lean NO$_x$ traps (LNT) catalysts operate with infrequent periodic rich transients. In addition, these catalysts may also be used in other lean burn vehicle applications where the rich transient is applied only for the specific objective of reducing tailpipe N$_2$O emissions.

The conversion chemistries follow the following reactions:

Decomposition:

$$2N_2O \rightarrow 2N_2 + O_2 \quad \text{(I)}$$

Reduction:

$$N_2O + H_2 \rightarrow N_2 + H_2O \quad \text{(IIa)}$$

$$N_2O + HC \rightarrow N_2 + CO_2 + H_2O \quad \text{(IIb)}$$

$$N_2O + CO \rightarrow N_2 + CO_2 \quad \text{(IIc)}$$

$$3N_2O + 2NH_3 \rightarrow 4N_2 + 3H_2O \quad \text{(IId)}.$$

The following definitions are used herein.

As used herein, "platinum group metal (PGM) component," "platinum (Pt) component," "rhodium (Rh) component," "palladium (Pd) component," "iridium (Ir) component," "ruthenium (Ru) component" and the like refers to the respective platinum group metal compound, complex, or the like which, upon calcination or use of the catalyst decomposes or otherwise converts to a catalytically active form, usually, the metal or the metal oxide.

"Ceria-containing support" refers to a support material that at least contains ceria. For example, a ceria-containing support may be bulk ceria that optionally comprises a promoter metal. A ceria-containing support may be a mixed metal oxide in solid solution form comprising ceria and one or more of the following: zirconia, praseodymia, lanthana, neodymia, yttria, samaria, and gadolinia.

Reference to "single phase" means a material that exhibits a single crystal structure, even in the presence of differing elements. One way to determine the presence of a single phase is by X-Ray Diffraction (XRD) techniques. As used herein, XRD is conducted on powdered samples to characterize the structure of the materials.

Measurement by XRD means that the three-dimensional structure of the crystal is identified and characterized by specific lattice parameters. A single phase cubic material has only one lattice parameter.

A "cubic fluorite crystal structure" as determined by XRD, means that the crystal is in an isometric cubic form that is exhibited by CaF$_2$.

"BET surface area" has its usual meaning of referring to the Brunauer-Emmett-Teller method for determining surface area by N$_2$-adsorption measurements. Unless otherwise stated, "surface area" refers to BET surface area.

"Support" in a catalytic material or catalyst washcoat refers to a material that receives precious metals, stabilizers, promoters, binders, and the like through precipitation, association, dispersion, impregnation, or other suitable methods.

"Refractory metal oxide supports" include bulk alumina, ceria, zirconia, titania, silica, magnesia, neodymia, and other materials known for such use. Such materials are considered as providing durability to the resulting catalyst.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of about 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases.

As used herein, the term "molecular sieves", such as zeolites and other zeolitic framework materials (e.g. isomorphously substituted materials), refer to materials, which may in particulate form support catalytic precious group metals. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size.

As used herein, the term "zeolite" refers to a specific example of a molecular sieve, further including silicon and aluminum atoms. Zeolites are crystalline materials having rather uniform pore sizes which, depending upon the type of zeolite and the type and amount of cations included in the zeolite lattice, range from about 3 to about 10 Angstroms in diameter.

A promoter as used herein is a metal that enhances activity towards a desired chemical reaction or function. Promoters of nitrous oxide ($N_2O$) decomposition include, but are not limited to, base metals and/or one or more PGMs. Promoters of oxygen storage include, but are not limited to, rare earth metal oxides.

"Rare earth metal oxides" refer to one or more oxides of scandium, yttrium, and the lanthanum series defined in the Periodic Table of Elements. Rare earth metal oxides can be both exemplary oxygen storage components and promoters of oxygen storage. Suitable promoters for oxygen storage include one or more rare earth metals selected from the group consisting of lanthanum, cerium, neodymium, gadolinium, yttrium, praseodymium, samarium, and mixtures thereof.

"Alkaline earth metal oxides" refer to Group II metal oxides, which are exemplary stabilizer materials. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium.

"Washcoat" is a thin, adherent coating of a catalytic or other material applied to a carrier substrate, such as a honeycomb flow through monolith substrate or a filter substrate, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

A "carrier" is a monolith support, examples of which include, but are not limited to, honeycomb flow through substrates and wall-flow filter substrates. Reference to "monolithic substrate" means a unitary structure that is homogeneous and continuous and has not been formed by affixing separate substrate pieces together.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

A "zoned" carrier is the same carrier substrate coated with at least two catalyst compositions contained in separate washcoat slurries in an axially zoned configuration. For example, the same carrier substrate is coated with washcoat slurry of one catalyst composition upstream of the carrier and a washcoat slurry of another catalyst composition is applied downstream of the carrier, wherein each catalyst composition is different.

"TWC" refers to the function of three-way conversion where hydrocarbons, carbon monoxide, and nitrogen oxides are substantially simultaneously converted. A gasoline engine typically operates under near stoichiometric reaction conditions that oscillate or are pertubated slightly between fuel-rich and fuel-lean air to fuel ratios (A/F ratios) ($\lambda=1\pm\sim0.01$), at perturbation frequencies of 0.5 to 2 Hz. This mode of operation is also referred to as "perturbated stoichiometric" reaction conditions. Use of "stoichiometric" herein refers to the conditions of a gasoline engine, accounting for the oscillations or perturbations of A/F ratios near stoichiometric. TWC catalysts include oxygen storage components (OSCs) such as ceria that have multi-valent states which allows oxygen to be held and released under varying air to fuel ratios. Under rich conditions when NOx is being reduced, the OSC provides a small amount of oxygen to consume unreacted CO and HC. Likewise, under lean conditions when CO and HC are being oxidized, the OSC reacts with excess oxygen and/or NOx. As a result, even in the presence of an atmosphere that oscillates between fuel-rich and fuel-lean air to fuel ratios, there is conversion of HC, CO, and NOx all at the same (or at essentially all the same) time. Typically, a TWC catalyst comprises one or more platinum group metals such as palladium and/or rhodium and optionally platinum; an oxygen storage component; and optionally promoters and/or stabilizers. Under rich conditions, TWC catalysts can generate ammonia.

"OSC" refers to an oxygen storage component, which is an entity that has multi-valent oxidation states and can actively react with oxidants such as oxygen ($O_2$) or nitric oxide ($NO_2$) under oxidative conditions, or reacts with reductants such as carbon monoxide (CO) or hydrogen ($H_2$) under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium.

"DOC" refers to diesel oxidation catalysts, which convert hydrocarbons and carbon monoxide in the exhaust gas of a diesel engine. Typically, a DOC comprises one or more platinum group metals such as palladium and/or platinum; a support material such as alumina; and optionally promoters and/or stabilizers.

Figure 23:
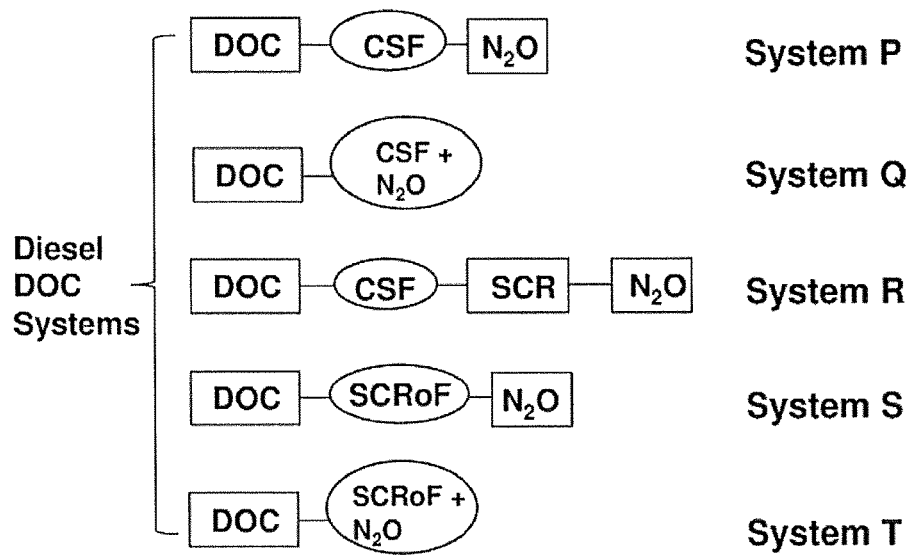
FIG. 23 provides flow diagrams of exemplary diesel DOC exhaust systems including N$_2$O catalysts.

A diesel engine typically operates under fuel lean air to fuel ratios (A/F ratios) (λ>1) (no LNT functionality). Such an engine usually never has a rich transient. FIG. 23 discussed below describes an inventive system configuration wherein a rich strategy to traditional diesel engine operating conditions is imposed solely for the object of $N_2O$ control.

"CSF" refers to a catalyzed soot filter, which is a wall-flow substrate having an oxidation catalyst suitable to collect soot particles at low temperature and to burn soot during regeneration conditions. "GPF" refers to a TWC catalyst applied to a wall-flow filter.

"LNT" refers to a lean-NOx trap, which is a catalyst containing a platinum group metal, ceria, and an alkaline earth trap material suitable to adsorb NOx during lean conditions (for example BaO or MgO). Under rich conditions, NOx is released and reduced to nitrogen.

"GDI" refers to a gasoline direct injection gasoline engine, which operates under lean burn conditions.

"Selective Catalytic Reduction" (SCR) is the catalytic reduction of nitrogen oxides with a reductant in the presence of an appropriate amount of oxygen with the formation predominantly of nitrogen and steam. Reductants may be, for example, hydrocarbon, hydrogen, and/or ammonia. SCR reactions in the presence of ammonia occur according to the following two reactions:

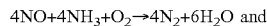

$$4NO+4NH_3+O_2 \rightarrow 4N_2+6H_2O \text{ and}$$

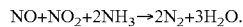

$$NO+NO_2+2NH_3 \rightarrow 2N_2+3H_2O.$$

An SCR catalyst generally comprises a molecular sieve promoted with a base metal, which operates to reduce NOx in the presence of, for example, $NH_3$ under lean conditions. "SCRoF" refers to a SCR catalyst applied to a wall-flow particulate filter.

"AMOx" refers to a selective ammonia oxidation catalyst, which is a catalyst containing one or more metals (typically including Pt) and an SCR catalyst suitable to convert ammonia to nitrogen.

The term "lean" engine operating conditions refers to the burning of fuel with an excess of air present in the internal combustion engine. In lean burn engines the air/fuel ratio (A/F) is typically about 15:1 (as compared to the air/fuel ratio of 14.7:1 needed to stoichiometrically combust gasoline). Likewise, an internal combustion engine operating under "rich" operating conditions refers to operating condition wherein the air/fuel ratio is less than stoichiometric. When combustion engines operate under "rich" operating conditions for short time intervals one often defines such time intervals as "periodic rich transient excursions". These time intervals can last from seconds to several minutes.

Figure 20:
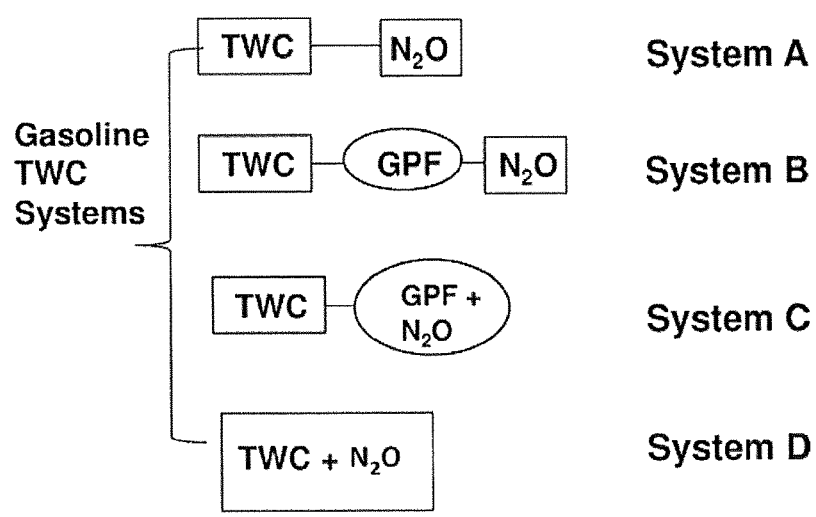
FIG. 20 provides flow diagrams of exemplary gasoline TWC exhaust systems including N$_2$O catalysts.

Exhaust Gas Stream Systems $N_2O$ catalysts may be incorporated in various ways downstream of an internal combustion engine. Turning to the figures, FIG. 20 provides flow diagrams of exemplary gasoline TWC exhaust systems including $N_2O$ catalysts. System A depicts a three-way conversion (TWC) catalyst followed by a $N_2O$ catalyst. System B depicts a TWC catalyst followed by a gasoline particulate filter (GPF) followed by an $N_2O$ catalyst. System C depicts a TWC catalyst followed by a $N_2O$ catalyst on a gasoline particulate filter (GPF+$N_2O$). System D depicts a TWC catalyst and a $N_2O$ catalyst on the same carrier. The TWC and $N_2O$ catalysts may, for example, be layered or zoned.

Figure 21:
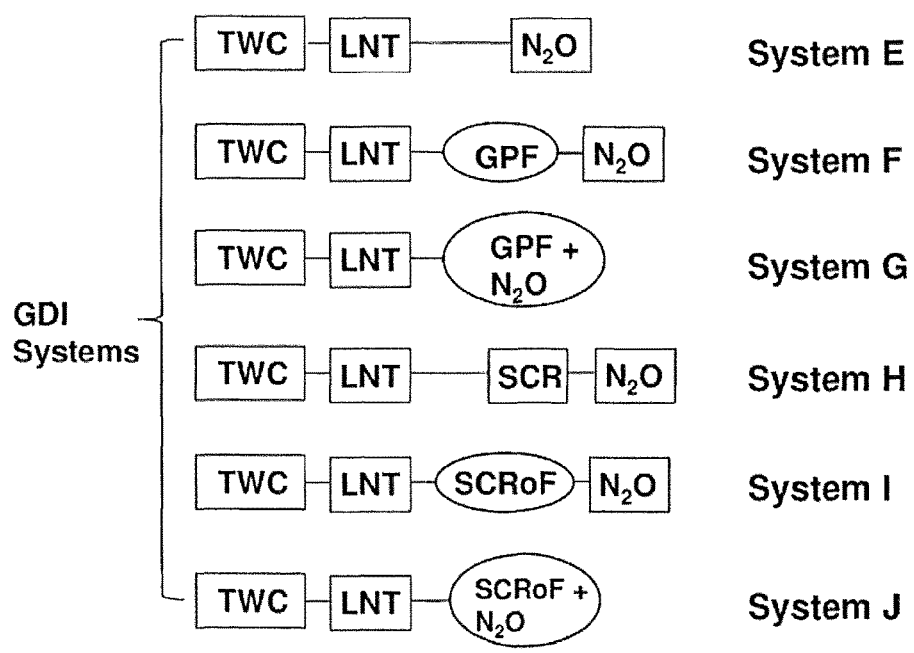
FIG. 21 provides flow diagrams of exemplary GDI exhaust systems including N$_2$O catalysts.

FIG. 21 provides flow diagrams of exemplary GDI exhaust systems including $N_2O$ catalysts. System E depicts a three-way conversion (TWC) catalyst followed by a LNT followed by a $N_2O$ catalyst. System F depicts a TWC catalyst followed by a LNT followed by a gasoline particulate filter (GPF), followed by a $N_2O$ catalyst. System G depicts a TWC catalyst followed by a LNT, followed by a $N_2O$ catalyst on a gasoline particulate filter (GPF+$N_2O$). System H depicts a TWC catalyst followed by a LNT followed by a SCR catalyst followed by a $N_2O$ catalyst. System I depicts a TWC catalyst followed by a LNT followed by a SCRoF, followed by a $N_2O$ catalyst. System J depicts a TWC catalyst followed by a LNT, followed by a $N_2O$ catalyst on a SCRoF.

Figure 22:
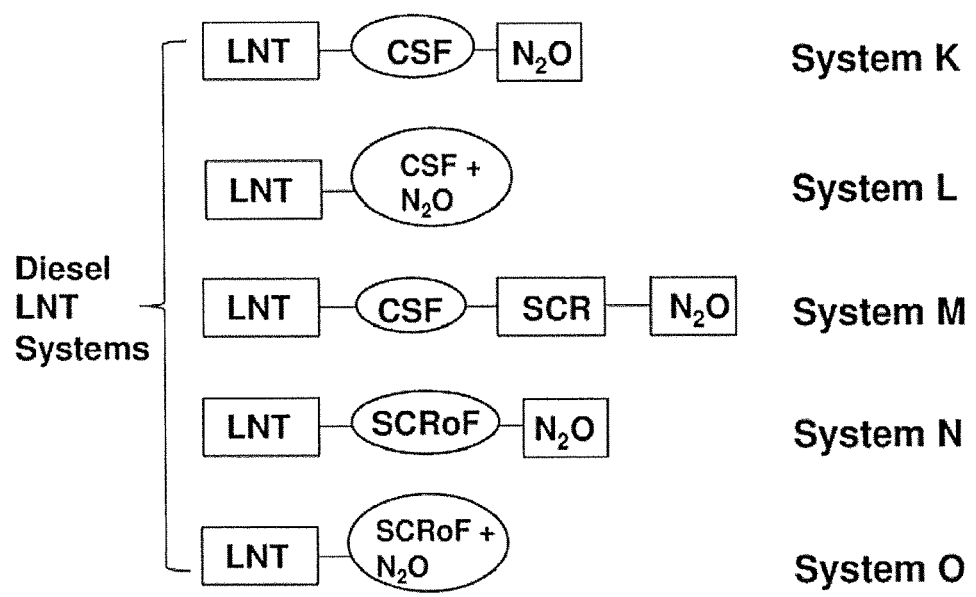
FIG. 22 provides flow diagrams of exemplary diesel LNT exhaust systems including N$_2$O catalysts.

FIG. 22 provides a flow diagram of exemplary diesel LNT exhaust systems including $N_2O$ catalysts. System K depicts a lean NOx trap (LNT) followed by a catalytic soot filter (CSF) followed by a $N_2O$ catalyst. System L depicts a LNT followed by a $N_2O$ catalyst on a catalyzed soot filter (CSF+$N_2O$). System M depicts a LNT followed by a CSF, followed by a SCR catalyst, followed by a $N_2O$ catalyst. System N depicts a LNT followed by a SCR catalyst on a filter (SCRoF) followed by a $N_2O$ catalyst. System O depicts a LNT followed by a $N_2O$ catalyst on a SCRoF.

FIG. 23 provides a flow diagram of exemplary diesel DOC exhaust systems including $N_2O$ catalysts. System P depicts a diesel oxidation catalyst (DOC) followed by a catalytic soot filter (CSF) followed by a $N_2O$ catalyst. System Q depicts a DOC followed by a $N_2O$ catalyst on a catalyzed soot filter (CSF+$N_2O$). System R depicts a DOC followed by a CSF, followed by a SCR catalyst, followed by a $N_2O$ catalyst. System S depicts a DOC followed by a SCR catalyst on a filter (SCRoF) followed by a $N_2O$ catalyst. System T depicts a DOC followed by a $N_2O$ catalyst on a SCRoF. In FIG. 23, DOC systems are contemplated that add periodic rich transients to the operation of traditional diesel engines, which usually are run solely under lean conditions. Such DOC systems (no LNT) as proposed herein can then use $N_2O$ catalysts as described herein for the purpose of $N_2O$ removal.

$N_2O$ Catalysts

Washcoats of $N_2O$ catalytic material comprising a platinum group metal (PGM) component supported on a ceria-containing support that has a single phase, cubic fluorite crystal structure may be made by various techniques. In general terms, a salt of the PGM is impregnated onto a ceria-containing powder by, for example, incipient wetness techniques. The impregnated powder is then slurried in deionized water to form a washcoat. Additional process steps may be applied to either the impregnated powder or the slurry prior to coating the washcoat onto a carrier.

The ceria-containing support is preferably 100% ceria, comprising at least about 50% by weight ceria, or even at least about 55 wt.-%, at least about 60 wt.-%, at least about 65 wt.-%, at least about 70 wt. %, at least about 75 wt.-%, at least about 80 wt.-%, at least about 85 wt.-%, at least about 90 wt.-%, at least about 91 wt.-%, at least about 92 wt.-%, at least about 93 wt.-%, at least about 94 wt.-%, at least about 95 wt.-%, at least about 96 wt.-%, at least about 97 wt.-%, at least about 98 wt.-%, at least about 99 wt.-%, or even at least about 99.9 wt.-%.

The ceria-containing support may be a mixed metal oxide composite, where the balance of the mixed metal oxide may comprise zirconia, lanthana, yttria, praeseodymia, neodymia, samaria, gadolinia, or other rare earth metal oxides.

To the slurry may be added any desired additional ingredients such as platinum group metals, stabilizers, and promoters. In one or more embodiments, the slurry is acidic, having a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of a stabilizer, e.g., barium acetate, and a promoter, e.g., lanthanum nitrate, may be added to the slurry.

For coating onto a carrier that is a flow-through substrate, the slurry may thereafter be comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 10-50 wt. %, more particularly about 10-40 wt. %. The flow-through substrate may then be dipped one or more times in such slurry or the slurry may be coated on the substrate such that a desired loading of the washcoat is deposited, e.g., about 0.5 to about 5.0 g/in$^3$.

For coating onto a carrier that is a wall-flow monolith (filter), the slurry may be comminuted to result in substantially all of the solids having particle sizes of less than about 10 microns, i.e., between about 2-3 microns, in an average diameter. The comminution may be accomplished in a ball mill or other similar equipment, and the solids content of the slurry may be, e.g., about 5-30 wt. %, more particularly about 10-20 wt. %. The filter may then be dipped one or more times in such slurry or the slurry may be coated on the filter such that a desired loading of the washcoat is deposited, e.g., about 0.1 to about 3.0 g/in$^3$.

Thereafter the coated carrier is calcined by heating, e.g., at about 400-800° C. for about 10 minutes to about 3 hours.

Typically, when a platinum group metal or a base metal is desired, a metal component is utilized in the form of a soluble compound or complex to achieve dispersion of the component on the ceria-containing support. For the purposes herein, the term "metal component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. During the calcination step, or at least during the initial phase of use of the composite, such compounds are converted into a catalytically active form of the metal or a compound thereof.

The N$_2$O removal catalysts may be used in conjunction with other catalytically active materials in any combination such as in a homogeneous mixture, or in a zoned and/or layered form. For example, the PGM component supported on the ceria-containing support (i.e., the N$_2$O catalyst as described herein) may be used in conjunction with another precious metal (e.g., Pt and/or Pd) on a high surface area refractory metal oxide support (e.g., γ-Al$_2$O$_3$) that is effective to oxidize hydrocarbons and/or carbon monoxide under conditions of the exhaust stream. Such an overall combination of catalytic materials may in turn be used to formulate a TWC catalyst and/or an LNT catalyst with the optional addition of further components such as other precious metals, supports, stabilizers, promoters, binders, and the like.

Additional functional catalytic layers may be prepared and deposited upon previous layers in the same manner as described above for deposition of any layer upon the carrier.

Figure 24:
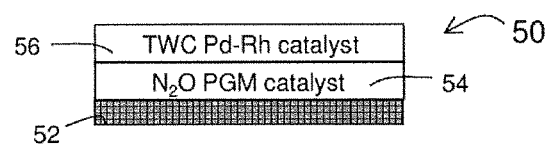
FIGS. 24-26 depict exemplary layered and/or zoned composites comprising a TWC catalyst and a N$_2$O catalyst on a flow-through substrate.

FIG. 24 depicts an exemplary layered composite 50 of a TWC catalyst and a N$_2$O catalyst where a top layer 56 comprises a supported Pd—Rh catalyst for TWC and a bottom layer 54 comprises the PGM on ceria-containing support N$_2$O catalyst located on a flow-through carrier 52.

Figure 25:
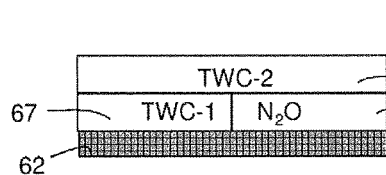

FIG. 25 depicts an exemplary layered and zoned composite 60 of a TWC catalyst and a N$_2$O catalyst where on flow-through carrier 62, a front (or upstream) zone 67 of a bottom (or first) layer comprises a TWC-1 catalyst (e.g., supported Pd, OSC) for certain TWC activity, a rear (or downstream) zone 65 comprises the PGM on ceria-containing support N$_2$O catalyst, and a top (or second) layer 66 comprises a catalyst TWC-2 (e.g., supported Rh) for certain TWC activity.

Figure 26:
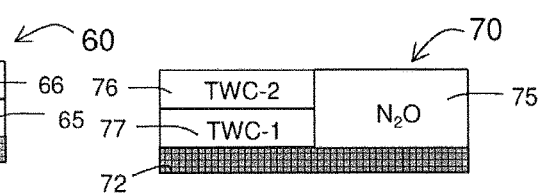

FIG. 26 depicts an exemplary zoned and layered composite 70 of a TWC catalyst and a N$_2$O catalyst where on flow-through carrier 72, a bottom (first) layer of a front (or upstream) zone 77 comprises a TWC-1 catalyst (e.g., supported Pd, OSC) for certain TWC activity, a top (or second) layer 76 of the front zone comprises a catalyst TWC-2 (e.g., supported Rh) for certain TWC activity, and a rear (or downstream) zone 75 comprises the PGM on ceria-containing support N$_2$O catalyst.

Figure 27:
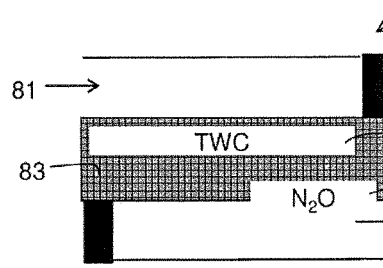
FIGS. 27-28 depict exemplary gasoline particulate filters comprising TWC catalyst and N$_2$O catalyst.

FIG. 27 depicts an exemplary composite 80 of a gasoline particulate filter having a TWC catalyst and a N$_2$O catalyst, where an upstream (or inlet) side 81 of a wall-flow filter suitable for capturing gasoline particulates 83 comprises a TWC catalyst 86 comprising, for example, palladium on alumina and an oxygen storage component (OSC) such as a ceria-zirconia composite, and a downstream (or outlet) side 89 of the filter 83 comprises the N$_2$O catalyst 85.

Figure 28:
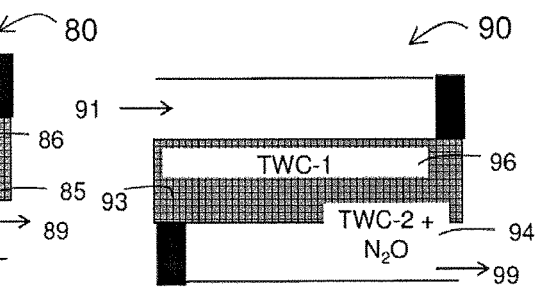

FIG. 28 depicts another exemplary composite 90 of a gasoline particulate filter having a TWC catalyst and a N$_2$O catalyst, where an upstream side 91 of a wall-flow filter suitable for capturing gasoline particulates 93 comprises a layer 96 comprising a TWC-1 catalyst comprising, for example, palladium on alumina or OSC for some TWC activity and a downstream side 99 of the filter 93 comprises a zone 94 that is a mixture of a TWC-2 catalyst comprising rhodium on alumina or OSC along with the N$_2$O catalyst.

Figures 29, 30:
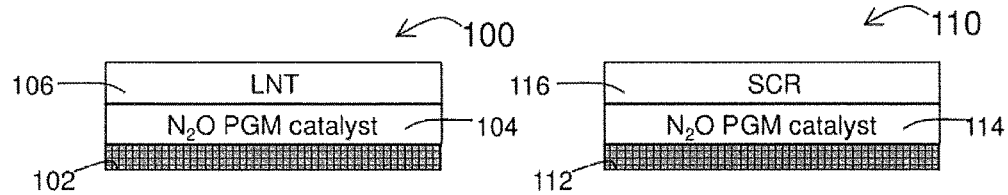
FIGS. 29-34 depict exemplary layer and/or zoned composites of diesel LNT or SCR catalysts and a N$_2$O catalyst on a flow-through substrate.

FIG. 29 depicts an exemplary layered composite 100 of an LNT catalyst and a N$_2$O catalyst where a top layer 106 comprises a suitable catalyst for LNT and a bottom layer 104 comprises the PGM on ceria-containing support N$_2$O catalyst located on a flow-through carrier 102.

FIG. 30 depicts an exemplary layered composite 110 of an SCR catalyst and a N$_2$O catalyst where a top layer 116 comprises a suitable catalyst for SCR and a bottom layer 114 comprises the PGM on ceria-containing support N$_2$O catalyst located on a flow-through carrier 112.

Figures 31, 32:
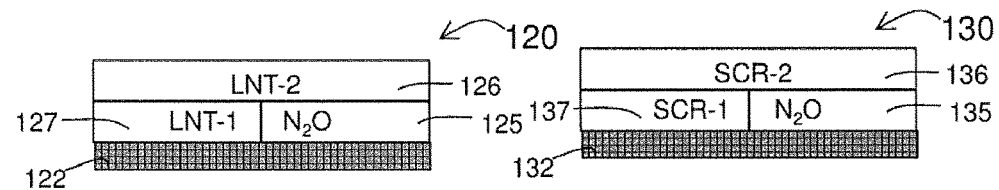

FIG. 31 depicts an exemplary layered and zoned composite 120 of an LNT catalyst and a N$_2$O catalyst where on flow-through carrier 122, a front (or upstream) zone 127 of a bottom (or first) layer comprises a LNT-1 catalyst for certain LNT activity, a rear (or downstream) zone 125 comprises the PGM on ceria-containing support $N_2O$ catalyst, and a top (or second) layer 126 comprises a catalyst LNT-2 for certain LNT activity.

FIG. 32 depicts an exemplary layered and zoned composite 130 of an SCR catalyst and a $N_2O$ catalyst where on flow-through carrier 132, a front (or upstream) zone 137 of a bottom (or first) layer comprises SCR-1 catalyst for certain SCR activity, a rear (or downstream) zone 135 comprises the PGM on ceria-containing support $N_2O$ catalyst, and a top (or second) layer 136 comprises catalyst SCR-2 for certain SCR activity.

Figures 33, 34:
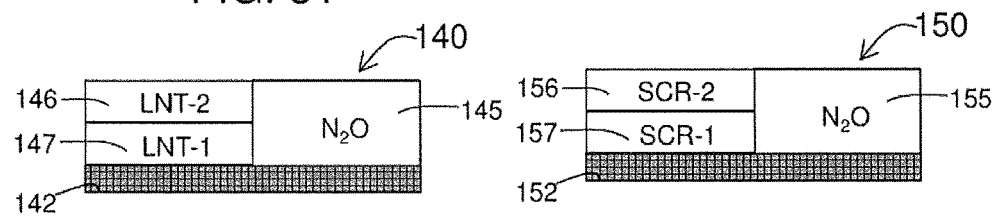

FIG. 33 depicts an exemplary zoned and layered composite 140 of an LNT catalyst and a $N_2O$ catalyst where on flow-through carrier 142, a bottom (first) layer of a front (or upstream) zone 147 comprises LNT-1 catalyst for certain LNT activity, a top (or second) layer 146 of the front zone comprises LNT-2 for certain LNT activity, and a rear (or downstream) zone 145 comprises the PGM on ceria-containing support $N_2O$ catalyst.

FIG. 34 depicts an exemplary zoned and layered composite 150 of an SCR catalyst and a $N_2O$ catalyst where on flow-through carrier 152, a bottom (first) layer of a front (or upstream) zone 157 comprises SCR-1 catalyst for certain SCR activity, a top (or second) layer 156 of the front zone comprises SCR-2 for certain LNT activity, and a rear (or downstream) zone 155 comprises the PGM on ceria-containing support $N_2O$ catalyst.

Figures 35, 36:
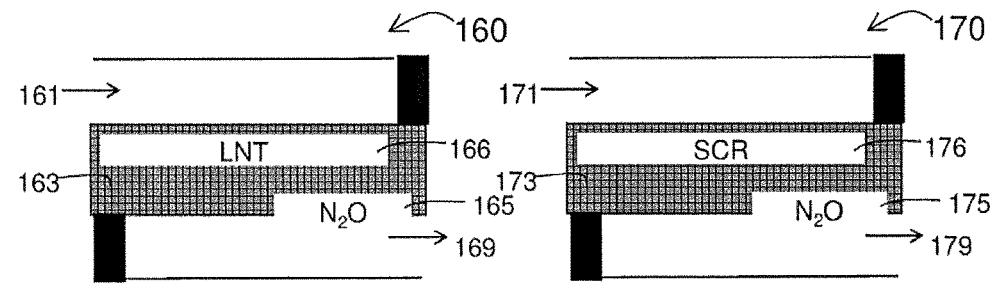
FIGS. 35-36 depict exemplary diesel particulate filters have LNT or SCR catalysts and a N$_2$O catalyst.

FIG. 35 depicts an exemplary composite 160 of a wall-flow filter (e.g., CSF) comprising an LNT catalyst and a $N_2O$ catalyst, where an upstream (or inlet) side 161 of a wall-flow filter suitable for capturing soot 163 comprises LNT catalyst 166, and a downstream (or outlet) side 169 of the filter 163 comprises the $N_2O$ catalyst 165.

FIG. 36 depicts an exemplary composite 170 of a wall-flow filter (e.g., CSF) comprising an SCR catalyst and a $N_2O$ catalyst, where an upstream (or inlet) side 171 of a wall-flow filter suitable for capturing soot 173 comprises SCR catalyst 176, and a downstream (or outlet) side 179 of the filter 173 comprises the $N_2O$ catalyst 175.

Carrier

Catalytic material is typically disposed on a carrier such as a monolithic substrate for exhaust gas applications.

The carrier may be any of those materials typically used for preparing catalyst composites, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The carrier may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Before describing several exemplary embodiments of the invention, it is to be understood that the invention is not limited to the details of construction or process steps set forth in the following description. The invention is capable of other embodiments and of being practiced in various ways. In the following, preferred designs are provided, including such combinations as recited used alone or in unlimited combinations, the uses for which include catalysts, systems, and methods of other aspects of the present invention.

Embodiments

Various embodiments are listed below. It will be understood that the embodiments listed below may be combined with all aspects and other embodiments in accordance with the scope of the invention.

Embodiment 1. A nitrous oxide ($N_2O$) removal catalyst composite for treatment of an exhaust stream of an internal combustion engine operating under conditions that are stoichiometric or lean with periodic rich transient excursions, the catalyst composite comprising:

a $N_2O$ removal catalytic material on a carrier, the catalytic material comprising a platinum group metal (PGM) component supported on a ceria-containing support having a single phase, cubic fluorite crystal structure, wherein the $N_2O$ removal catalytic material is effective to decompose $N_2O$ in the exhaust stream to nitrogen ($N_2$) and oxygen ($O_2$) or to reduce $N_2O$ to $N_2$ and water ($H_2O$) or carbon dioxide ($CO_2$).

Embodiment 2. The $N_2O$ removal catalyst composite of embodiment 1, wherein the ceria-containing support has a pore volume of at least 0.20 $cm^3/g$.

Embodiment 3. The N$_2$O removal catalyst composite of embodiment 1, wherein the ceria-containing support has a BET surface area of at least 10 m$^2$/g after aging at 950° C. for 20 hours with an alternating lean and rich feed.

Embodiment 4. The N$_2$O removal catalyst composite of embodiment 3, wherein the BET surface area of the ceria-containing support is about 10 to about 100 m$^2$/g.

Embodiment 5. The N$_2$O removal catalyst composite of embodiment 1, wherein the ceria-containing support has an X-ray diffraction (XRD) lattice parameter $a_0$ in the range of 0.517 to 0.541 nm.

Embodiment 6. The N$_2$O removal catalyst composite of embodiment 1, wherein the ceria-containing support comprises a mixed metal oxide in solid solution form comprising ceria and one or more metal oxides selected from the group consisting of zirconia, praseodymia, lanthana, neodymia, yttria, samaria, and gadolinia.

Embodiment 7. The N$_2$O removal catalyst composite of embodiment 6, wherein the mixed metal oxide comprise by weight: ceria in an amount of about 5% to about 95%; zirconia in an amount of about 5% to about 95%; and one or more of praseodymia, lanthana, neodymia, yttria, samaria, and gadolinia in an amount of 0% to about 20%.

Embodiment 8. The N$_2$O removal catalyst composite of embodiment 1, wherein the ceria-containing support comprises about 90 to about 100 weight % ceria and 0% to about 10 weight % of a promoter metal that is different from the PGM component.

Embodiment 9. The N$_2$O removal catalyst composite of embodiment 1, wherein the PGM component comprises a rhodium component, a palladium component, a platinum component, or a combination thereof, wherein the PGM component is present on the ceria-containing support in an amount of about 0.01% to about 5% by weight of the ceria-containing support.

Embodiment 10. The N$_2$O removal catalyst composite of embodiment 9, further comprising a promoter metal that is different from the PGM component in an amount in the range of 0.001-10 weight % of the ceria-containing support, the promoter metal comprising one or more base metals selected from the group consisting of: copper (Cu), manganese (Mn), iron (Fe), cobalt (Co), nickel (Ni), vanadium (V), chromium (Cr), zinc (Zn), and tin (Sn) and one or more additional platinum group metal components selected from the group consisting of: silver (Ag), iridium (Ir), gold (Au), and ruthenium (Ru).

Embodiment 11. The N$_2$O removal catalyst composite of embodiment 9, further comprising:
one or more additional platinum group metal components selected from the group consisting of silver (Ag), iridium (Ir), gold (Au), and ruthenium (Ru).

Embodiment 12. The N$_2$O removal catalyst composite of any of embodiments 1, wherein the carrier comprises a flow-through substrate or a wall-flow filter.

Embodiment 13. An emissions treatment system for treatment of an exhaust stream of an internal combustion engine operating under conditions that are stoichiometric or lean with periodic rich transient excursions, the emission treatment system comprising: an exhaust conduit in fluid communication with the internal combustion engine via an exhaust manifold; a treatment catalyst; and the N$_2$O removal catalyst composite according to any one of embodiments 1 to 12.

Embodiment 14. The emissions treatment system of embodiment 13, wherein the treatment catalyst comprises a nitrogen oxides treatment catalyst, which comprises: a three-way conversion (TWC) catalyst or a lean NOx trap (LNT), or a selective catalytic reduction (SCR) catalyst).

Embodiment 15. The emissions treatment system of embodiment 13, wherein the treatment catalyst comprises a diesel oxidation catalyst (DOC).

Embodiment 16. The emissions treatment system of claim 13, wherein the N$_2$O removal catalyst composite and the treatment catalyst are deposited on the carrier as separate layers or zones.

Embodiment 17. The emissions treatment system of claim 13, further comprising a second carrier on which the treatment catalyst is located.

Embodiment 18. A method for treating exhaust gases of an exhaust stream of an internal combustion engine operating under conditions that are stoichiometric or lean with periodic rich transient excursions comprising contacting the exhaust stream including hydrocarbons, carbon monoxide, and nitrogen oxides with the N$_2$O removal catalyst composite according to any one of embodiments 1 to 12.

Embodiment 19. The method of embodiment 18, wherein the internal combustion engine operating conditions include reducing conditions for a first time duration followed by lean operating conditions for a second time duration, wherein the second time duration is at least twice as long than the first time duration, and wherein during the second time duration, the contacting step results in conversion of at least 90% of N$_2$O in the exhaust gas stream.

Embodiment 20. The method of embodiment 18, wherein the N$_2$O removal catalyst composite is at a temperature of about 200° C. to about 500° C.

Embodiment 21. The method of embodiment 19, wherein the N$_2$O removal catalyst composite is at a temperature of about 200° C. to about 500° C.

Embodiment 22. The method of embodiment 20, wherein the N$_2$O removal catalyst composite is at temperature of 400° C. or below.

Embodiment 23. The method of any one of embodiments 19 wherein the first duration is about 0.25 to about 30 seconds and the second duration is about 1 to about 30 minutes.

Embodiment 24. The method of embodiment 18, wherein the N$_2$O removal catalyst composite is included in an exhaust gas treatment system comprising a lean NOx trap or a three-way conversion (TWC) catalyst, wherein the exhaust gas treatment system periodically requires rich conditions for nitrogen oxides (NOx) control.

Embodiment 25. The method of embodiment 18, wherein the N$_2$O removal catalyst composite is included in an exhaust gas treatment system comprising a diesel oxidation catalyst optionally in combination with a selective catalytic reduction catalyst, wherein the internal combustion engine operating condition include periods of rich operation for N$_2$O removal.

EXAMPLES

The following non-limiting examples shall serve to illustrate the various embodiments of the present invention. In each of the examples, the carrier was cordierite.

Example 1

Catalyst Preparation for Samples 1-10
Samples 1 to 3 were supported Rh catalysts with 1% Rh by weight prepared by the wet impregnation method. A slurry of a support material, about 30% solid, was made by adding deionized water to the support material powder. The slurry pH was subsequently adjusted to pH=4 with $HNO_3$. After a milling step, a Rh nitrate solution was added to the slurry, and the slurry was then dried under stirring. The resulting powder was calcined at 500° C. for 2 hours in air and was further thermally aged at 750° C. for 20 hours with 10% water in air. The $CeO_2$ and $Al_2O_3$ supports are commercially available materials, and the $ZrO_2$—$SiO_2$ material was made in-house according to the procedures described in U.S. Pat. No. 7,850,842, incorporated herein by reference. Samples 4 and 5 were made by co-impregnation of Rh and a secondary metal (Cu or Ag) nitrate solution on $CeO_2$ with the same procedures as Samples 1 to 3. Samples 6 to 10 were made by impregnating calcined Rh/$CeO_2$ (Sample 1) with a second metal precursor solution. Table 1 summarizes the catalyst information for Samples 1 to 10.

TABLE 1

Catalyst description for Samples 1 to 10

| Sample # | Rh (wt %) | Promoter metal (wt %) | Catalyst Support | Preparation method |
|---|---|---|---|---|
| 1 | 1.0 |  | $CeO_2$ | Rh impregnation |
| 2 | 1.0 |  | $Al_2O_3$ | Rh impregnation |
| 3 | 1.0 |  | $ZrO_2$—$SiO_2$ | Rh impregnation |
| 4 | 1.0 | 2% Cu | $CeO_2$ | Rh—Cu co-impregnation |
| 5 | 1.0 | 0.2% Ag | $CeO_2$ | Rh—Ag co-impregnation |
| 6 | 1.0 | 0.2% Ir | $CeO_2$ | Ir impregnation on calcined Rh/$CeO_2$ |
| 7 | 1.0 | 0.02% Au | $CeO_2$ | Au impregnation on calcined Rh/$CeO_2$ |
| 8 | 1.0 | 0.02% Pd | $CeO_2$ | Pd impregnation on calcined Rh/$CeO_2$ |
| 9 | 1.0 | 0.2% Pd | $CeO_2$ | Pd impregnation on calcined Rh/$CeO_2$ |
| 10 | 1.0 | 0.2% Pt | $CeO_2$ | Pt impregnation on calcined Rh/$CeO_2$ |

Example 2

Testing of Samples 1-10

Protocols. Samples 1 to 10 were tested in a high throughput reactor system with 0.2 g of sample shaped to 250-500 µm. The total gas flow rate was 50 L/h, corresponding to a monolith space velocity of 30,000 $h^{-1}$ with 2 g/$in^3$ washcoat loading. The $N_2O$ conversion was measured with an alternating lean/rich feed at 400° C. The lean feed consists of 200 ppm $N_2O$, 5% $CO_2$, 5% $H_2O$ and balance $N_2$, while the rich feed includes 200 ppm $N_2O$, 0.75% CO, 0.25% $H_2$, 5% $CO_2$, 5% $H_2O$ and balance $N_2$. The lean/rich cycle was run for 3 times for each catalyst with 20 minute lean and 1 minute rich.

Test results. FIG. 1 shows $N_2O$ conversion for Samples 1 to 3. The stabilized $N_2O$ conversion with a lean feed on Sample 1 is 84%. Upon switching to the rich feed, the conversion gradually increases to 95% at the end of rich period (1 min). After the feed is switched to lean again, the $N_2O$ conversion continues at the same level for about 310 seconds and then gradually restores to its steady-state lean level (84%). The higher lean $N_2O$ conversion observed after the rich period is the result of rich feed exposure. This rich effect is quite different on Samples 2 and 3. The stabilized lean $N_2O$ conversions on Samples 2 and 3 are low (20 and 22%, respectively), and after the 1-minute rich period the conversions drop from its high level after 40 seconds back to the stabilized levels within 100 seconds.

Figure 2:
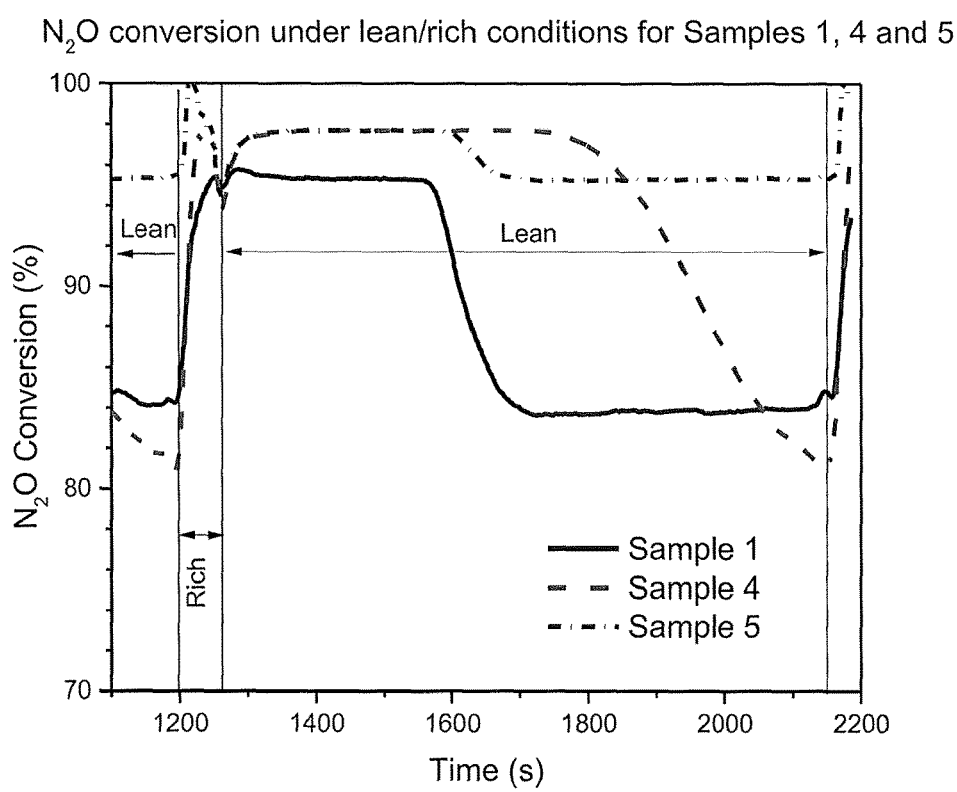
FIG. 2 is a graph showing N$_2$O conversion (%) versus time under lean/rich conditions for supported Rh catalysts Sample 1, Sample 4, and Sample 5.

FIG. 2 shows the $N_2O$ conversion on Samples 1, 4, and 5. Sample 4, Rh—Cu bimetal catalyst, shows a strong rich exposure effect; the lean $N_2O$ conversion after the rich exposure is 98% and lasts for 530 seconds. The Rh—Ag catalyst, Sample 5, has a very high stabilized lean $N_2O$ conversion (95%), and the rich exposure increases the conversion further to 98% for 340 seconds. Both Samples 4 and 5 have superior performance over Sample 1.

Figure 3:
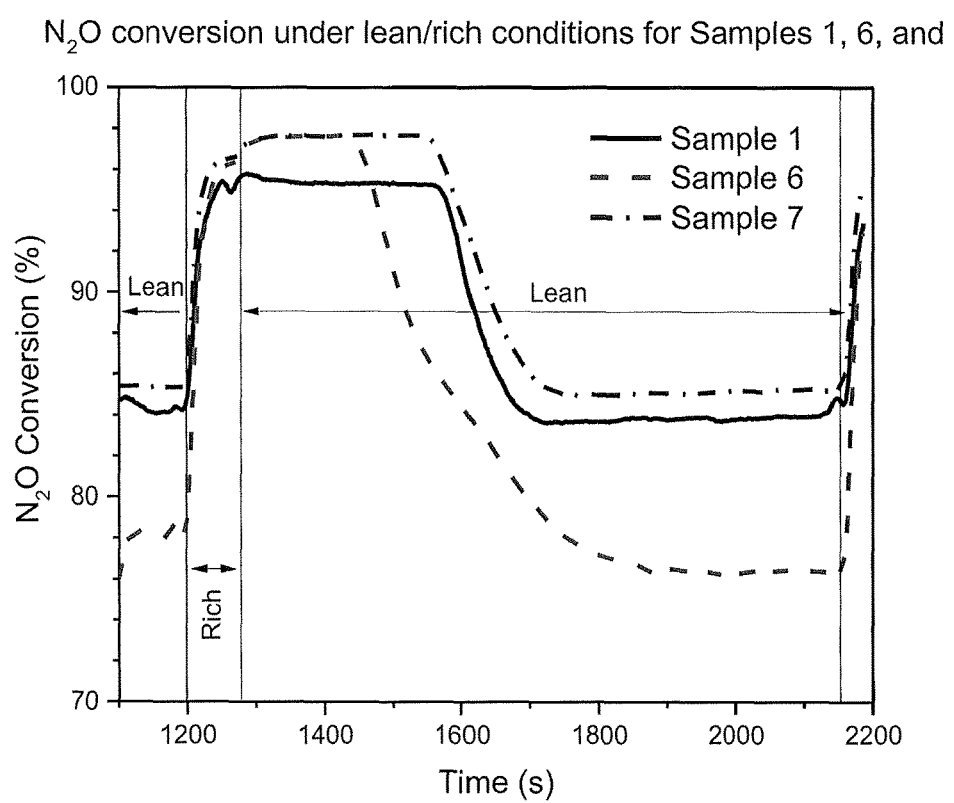
FIG. 3 is a graph showing N$_2$O conversion (%) versus time under lean/rich conditions for supported Rh catalysts Sample 1, Sample 6, and Sample 7.

FIG. 3 shows the $N_2O$ conversion on Samples 1, 6 and 7. Sample 6 (1% Rh, 0.2% Ir) is inferior to Sample 1 (1% Rh) in both stabilized lean $N_2O$ conversion and the lean (~190 seconds) duration of the rich exposure effect. Sample 7 (1% Rh, 0.02% Au), on the other hand, is slightly better than Sample 1, its $N_2O$ conversion is 98% in rich feed, and the conversion maintains this level for 300 seconds after the rich period.

Figure 4:
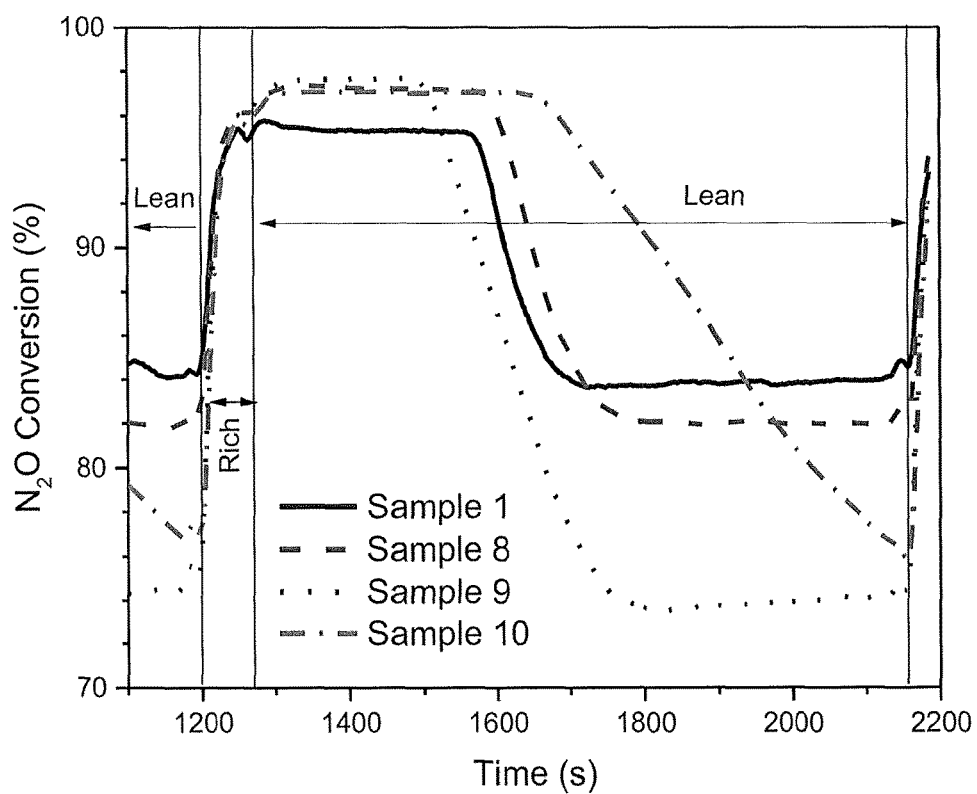
FIG. 4 is a graph showing N$_2$O conversion (%) versus time under lean/rich conditions for supported Rh catalysts Sample 1, Sample 8, Sample 9, and Sample 10.

FIG. 4 shows the $N_2O$ conversion over Samples 8 to 10 in comparison to Sample 1. Sample 8 (1% Rh, 0.02% Pd) is comparable to Sample 1 in stabilized lean $N_2O$ conversion and in the extent of the rich exposure effect. Increasing the Pd loading to 0.2% (Sample 9) unexpectedly shortens the rich exposure effect to 240 s. Modification of the Rh catalyst with 0.2% Pt (Sample 10) increases the $N_2O$ conversion in the rich feed and the duration of the rich exposure effect (~390 seconds).

Example 3

Catalyst Preparation

Supported Rh, Pd, and Pt catalysts were prepared using the supports described in Table 2 with the same procedures used for Samples 1 to 3, with one exception. All catalysts were aged at 950° C. for 20 hours with a lean/rich cycling feed. All support materials were obtained from commercial sources. For Supports B to G, the number after an element represents the weight percent of that element as oxide.

TABLE 2

Description of catalyst support used for Rh, Pd and Pt catalysts

| Support ID | Support composition (wt % as oxide) | BET Surface Area[a] ($m^2$/g) | Pore Volume[a] ($cm^3$/g) |
|---|---|---|---|
| A | $CeO_2$ | 26.7 | 0.26 |
| B | Ce65Zr20Y8La2Nd5 | 34.8 | 0.3 |
| C | Ce45Zr45La8Pr2 | 44.5 | 0.5 |
| D | Ce30Zr55Y8La2Nd5 | 45.6 | 0.35 |
| E | Ce10Zr75Y8La2Nd5 | 45.2 | 0.46 |
| F | Zr91La9 | 38.7 | 0.41 |
| G | Ce45Pr55 | 5.3 | 0.06 |
| H | $Al_2O_3$ | 93.3 | 0.84 |

[a]Samples were aged at 950° C. for 20 hours before measurement.

Example 4

Testing

Test protocol under λ=1 perturbation conditions. Rh, Pd and Pt supported on Supports A to H were tested for $N_2O$ conversion with an oscillating feed 1 s lean ($\lambda$=1.05)/1 s rich ($\lambda$=0.95) at 200, 250, 300, 350, 400, 450, 500 and 550° C. At each temperature, the oscillating feed was equilibrated for 180 seconds, but only the data for the last 30 seconds were collected. The lean feed consists of 200 ppm $N_2O$, 0.7% CO, 0.22% $H_2$, 14% $CO_2$ and 10% $H_2O$ with an $O_2$ concentration tuned by a lambda sensor so that $\lambda$=1.05. The rich feed includes 2.33% CO, 0.77% $H_2$, 14% $CO_2$ and 10% $H_2O$ with an $O_2$ concentration tuned by a lambda sensor so that $\lambda$=0.95. Catalysts were tested in a high throughput reactor system with 0.2 g of sample shaped to 250-500 μm. The total gas flow was 50 L/h, corresponding to a monolith space velocity of 30,000 $h^{-1}$ with 2 $g/in^3$ washcoat loading.

Figure 5:
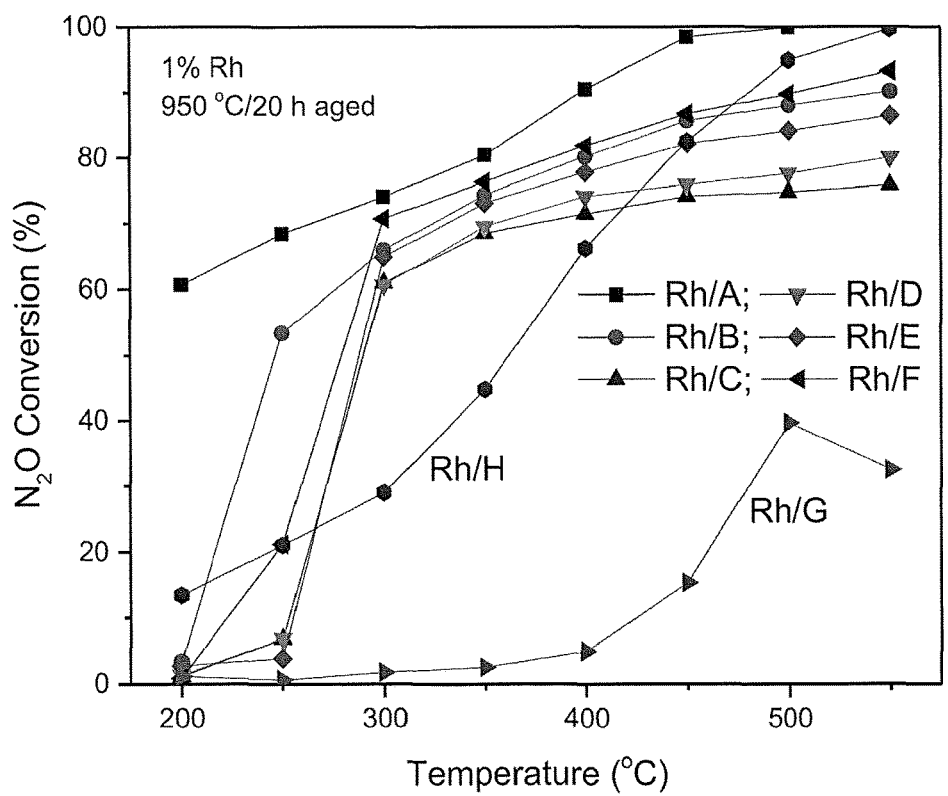
FIG. 5 is a graph showing N$_2$O conversion (%) versus temperature under $\lambda=1$ perturbation conditions for supported Rh (1 wt. %) catalysts.

Results of supported Rh, Pd and Pt tested under $\lambda$=1 perturbation conditions. FIG. 5 shows the $N_2O$ conversion on 1% Rh catalysts. 1% Rh/A is the most active catalyst of all tested catalysts in this study (60% conversion at 200° C.), while 1% Rh/G is the least active. The other catalysts are in between with variable activity profiles.

Figure 6:
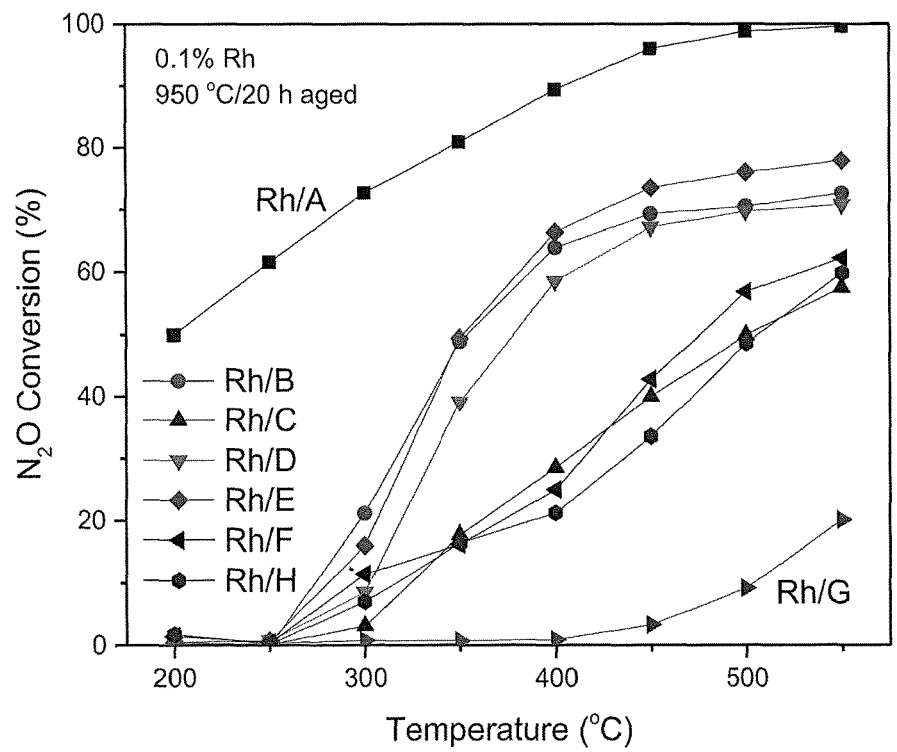
FIG. 6 is a graph showing N$_2$O conversion (%) versus temperature under $\lambda=1$ perturbation conditions for supported Rh (0.1 wt. %) catalysts.

FIG. 6 shows the $N_2O$ conversion on 0.1% Rh catalysts. Even with 1/10 of the Rh loading, Rh/A is still very active for $N_2O$ conversion with 50% conversion at 200° C. 0.1% Rh/G remains the least active catalyst in this group. Overall, the $N_2O$ conversion follows the following order: Rh/A>Rh/E~Rh/B~Rh/D>Rh/F~Rh/C~Rh/H>Rh/G.

Figure 7:
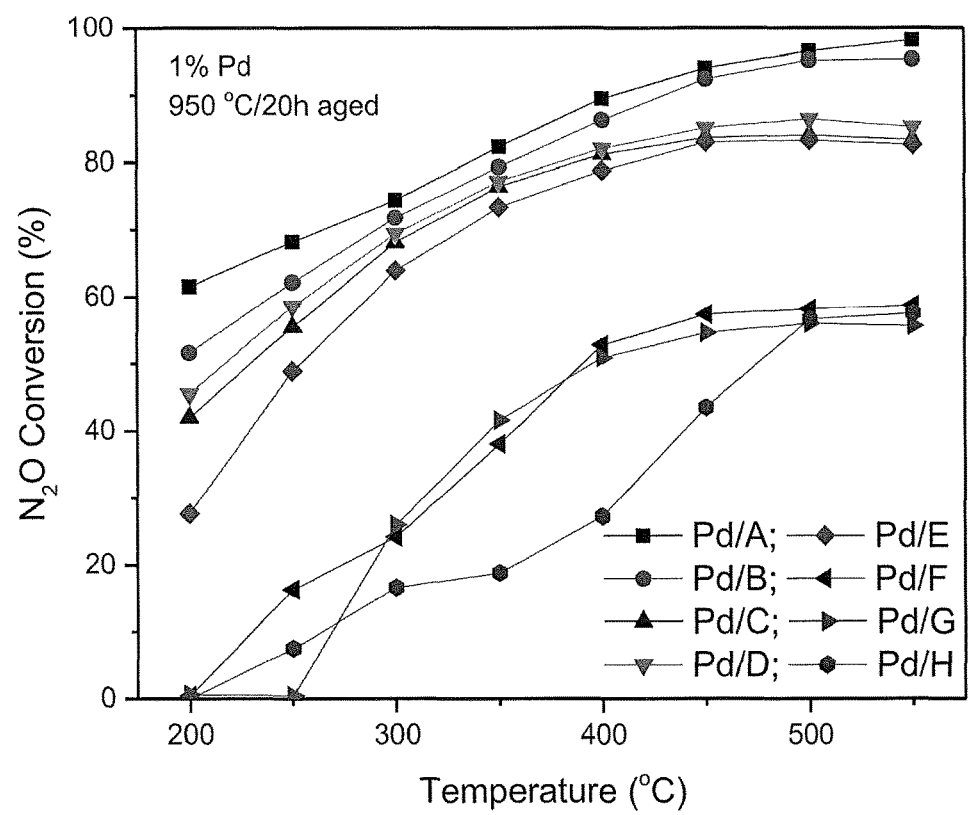
FIG. 7 is a graph showing N$_2$O conversion (%) versus temperature under $\lambda=1$ perturbation conditions for supported Pd (1 wt. %) catalysts.

FIG. 7 shows the $N_2O$ conversion on 1% Pd catalysts. The $N_2O$ activity of 1% Pd catalysts can be divided into two groups. The first group, including Pd/A, Pd/B, Pd/D, Pd/C and Pd/E, is much more active than the second group (Pd/F, Pd/G and Pd/H). Pd/A is the most active Pd catalyst (62% conversion at 200° C.), while Pd/H is the least active Pd catalyst.

Figure 8:
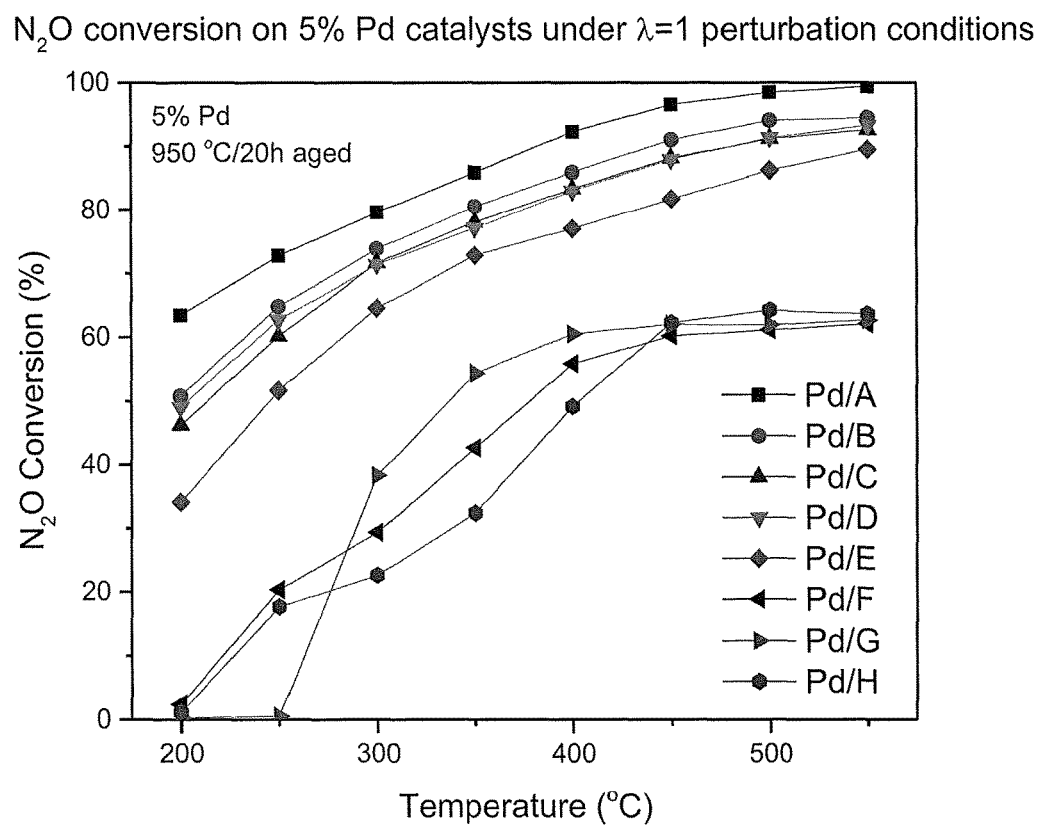
FIG. 8 is a graph showing N$_2$O conversion (%) versus temperature under $\lambda=1$ perturbation conditions for supported Pd (5 wt. %) catalysts.

FIG. 8 shows the $N_2O$ conversion on 5% Pd catalysts. The overall activity ranking of the 5% Pd catalyst is similar to that of 1% Pd catalysts but with slightly higher conversions.

Figure 9:
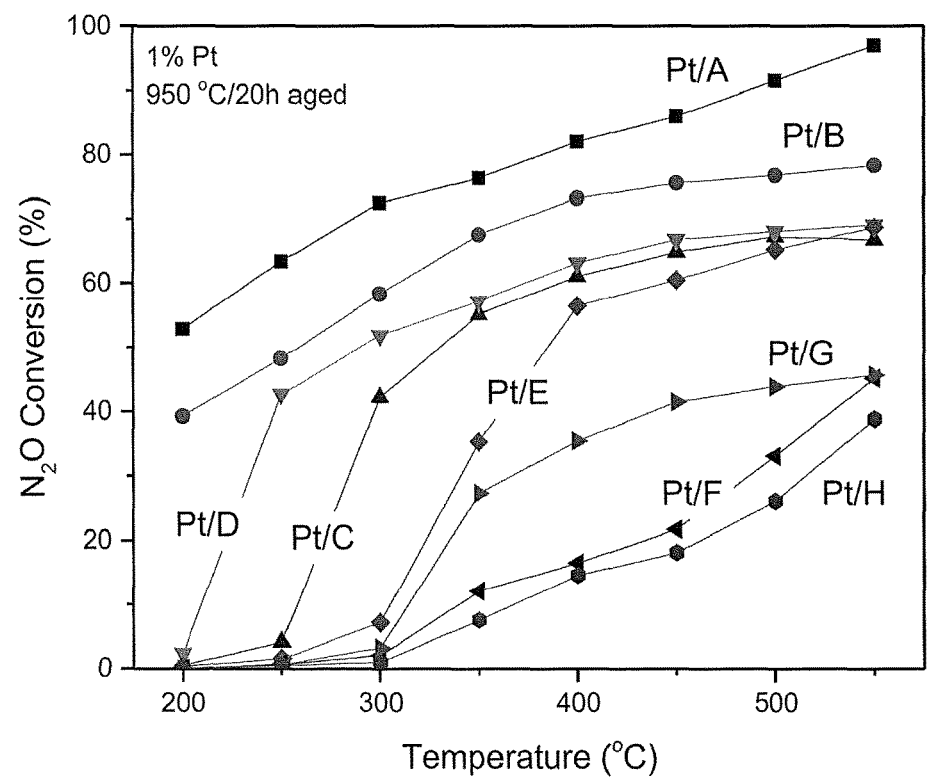
FIG. 9 is a graph showing N$_2$O conversion (%) versus temperature under $\lambda=1$ perturbation conditions for supported Pt (1 wt. %) catalysts.
Figure 10:
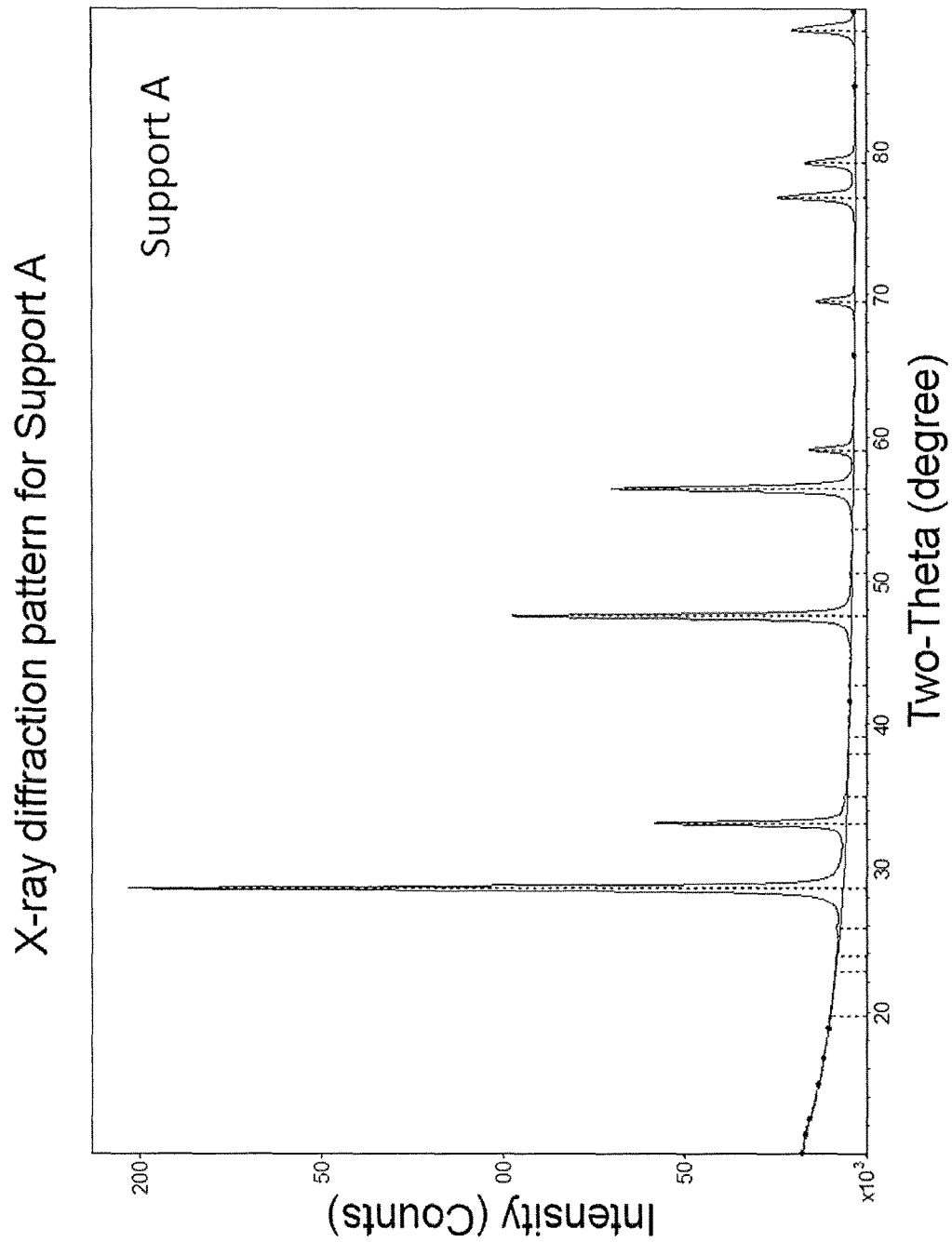
FIGS. 10-17 provide X-ray diffraction (XRD) spectra of the samples of 1% Rh on various supports.
Figure 11:
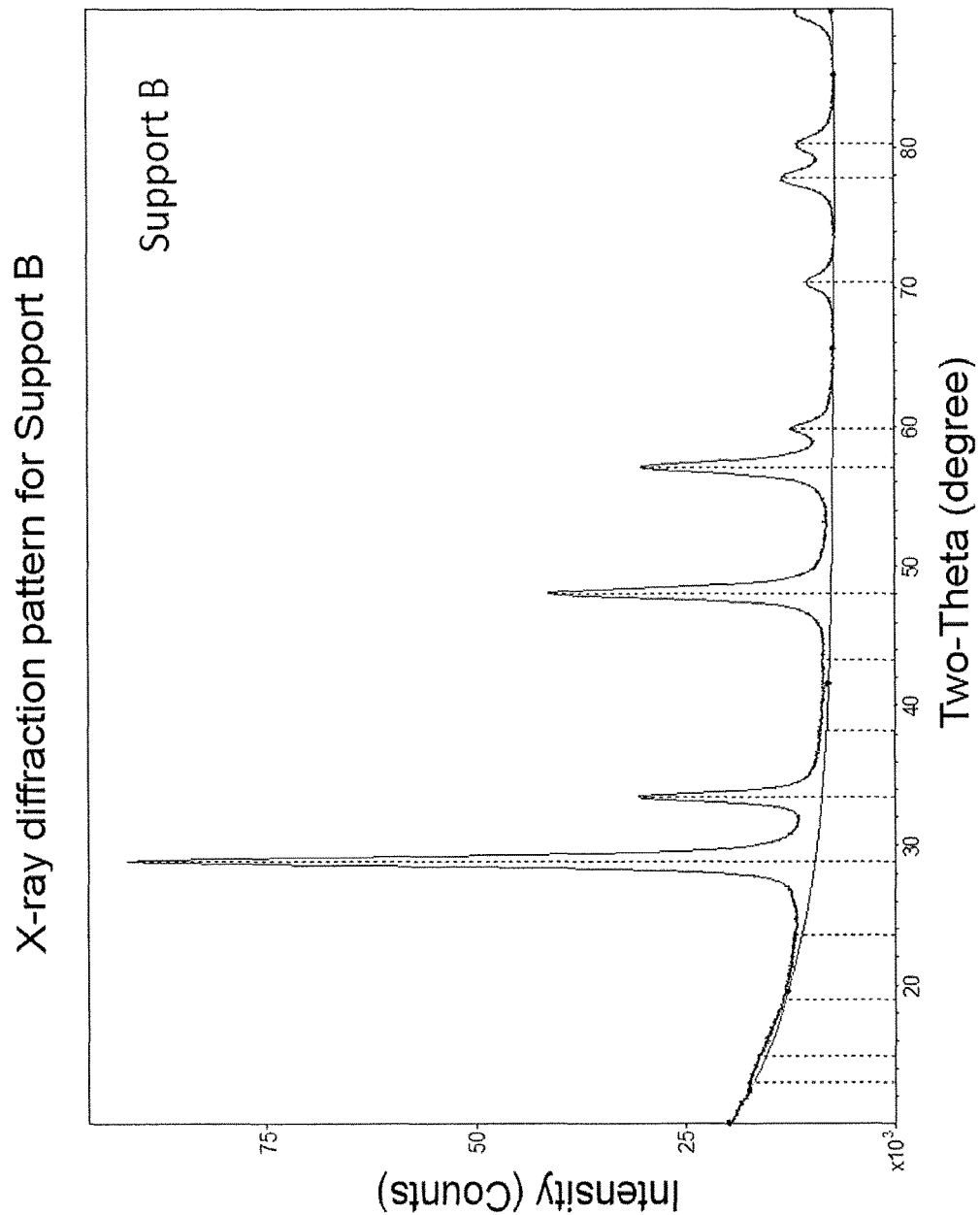
Figure 12:
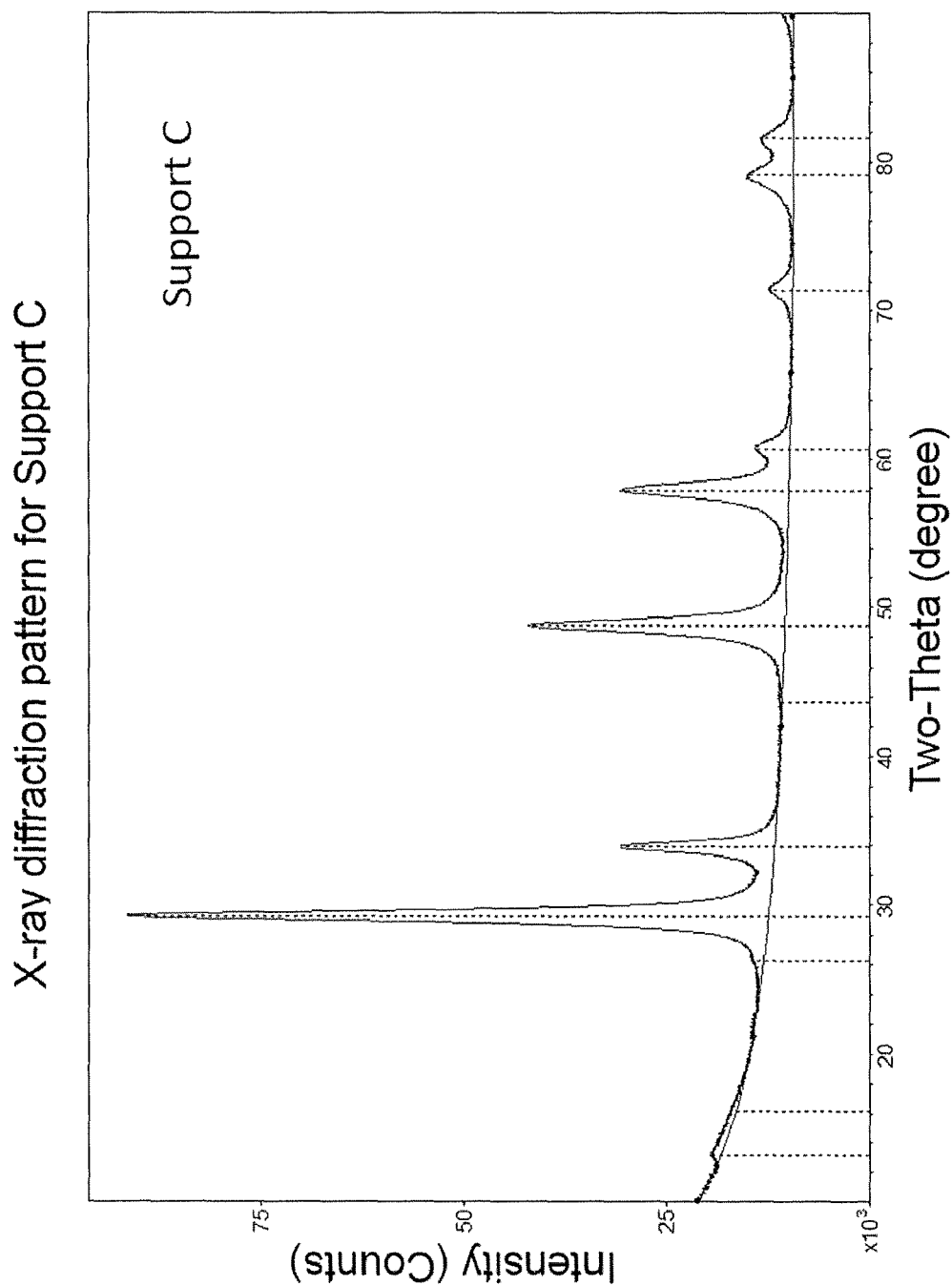
Figure 13:
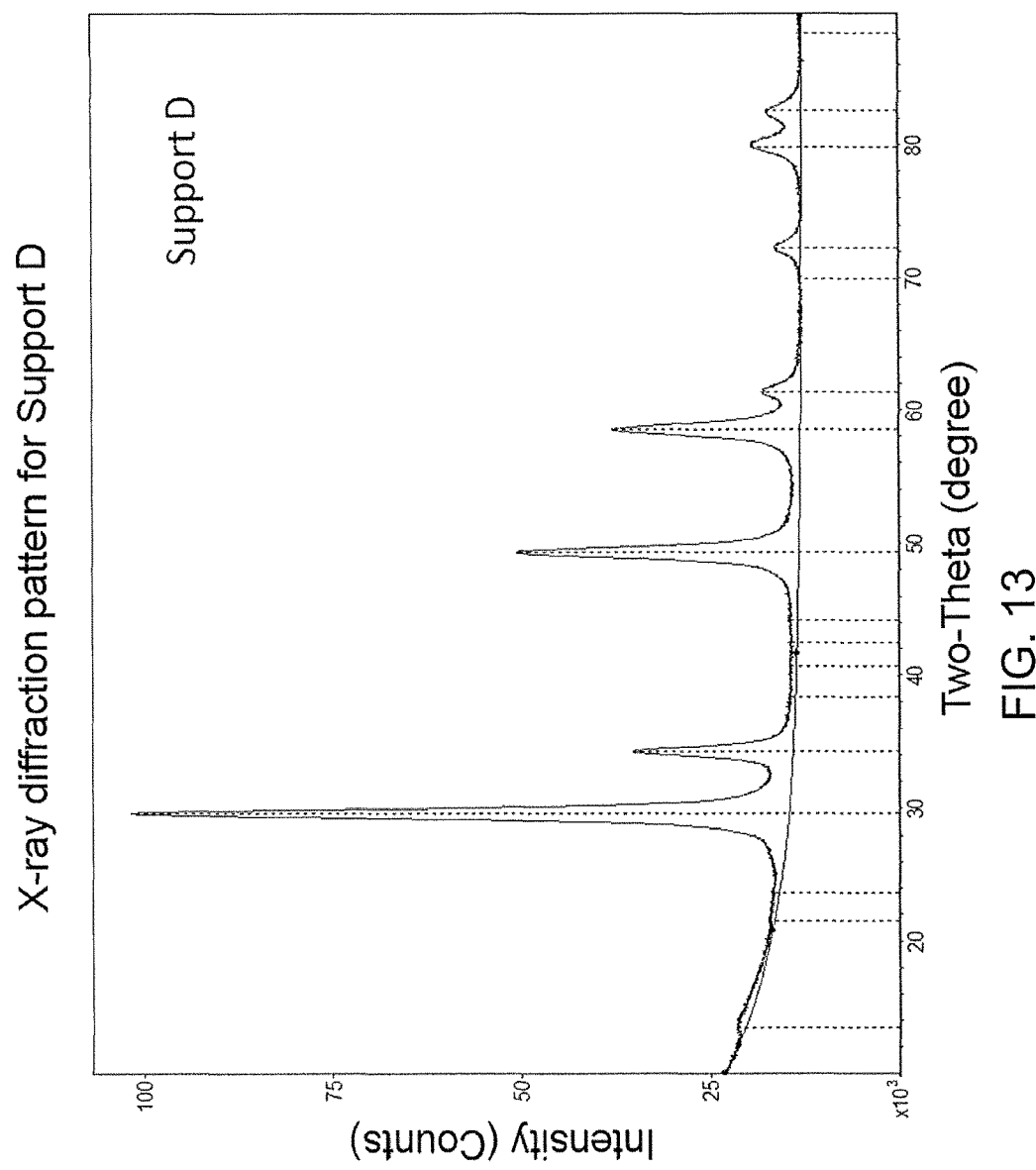
Figure 14:
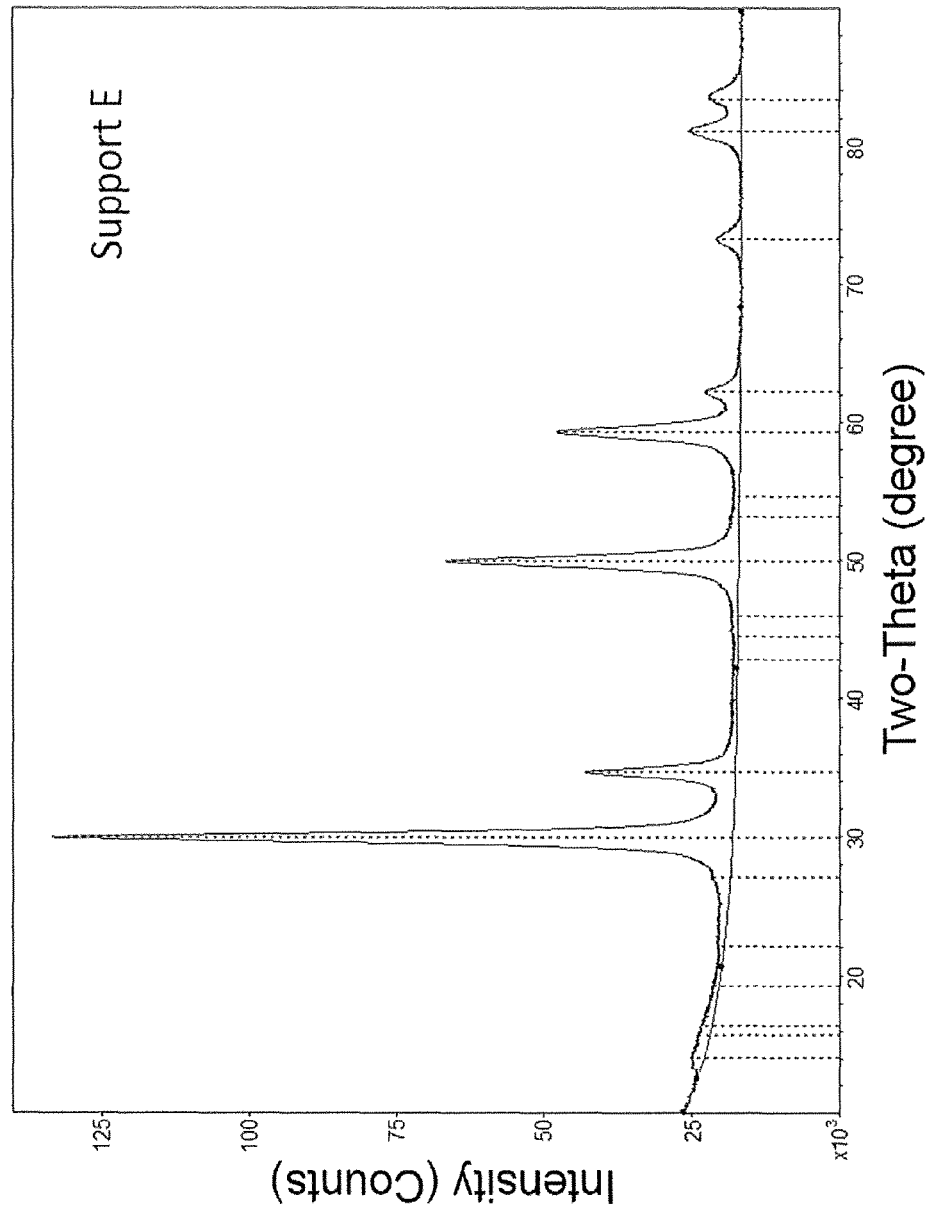
Figure 15:
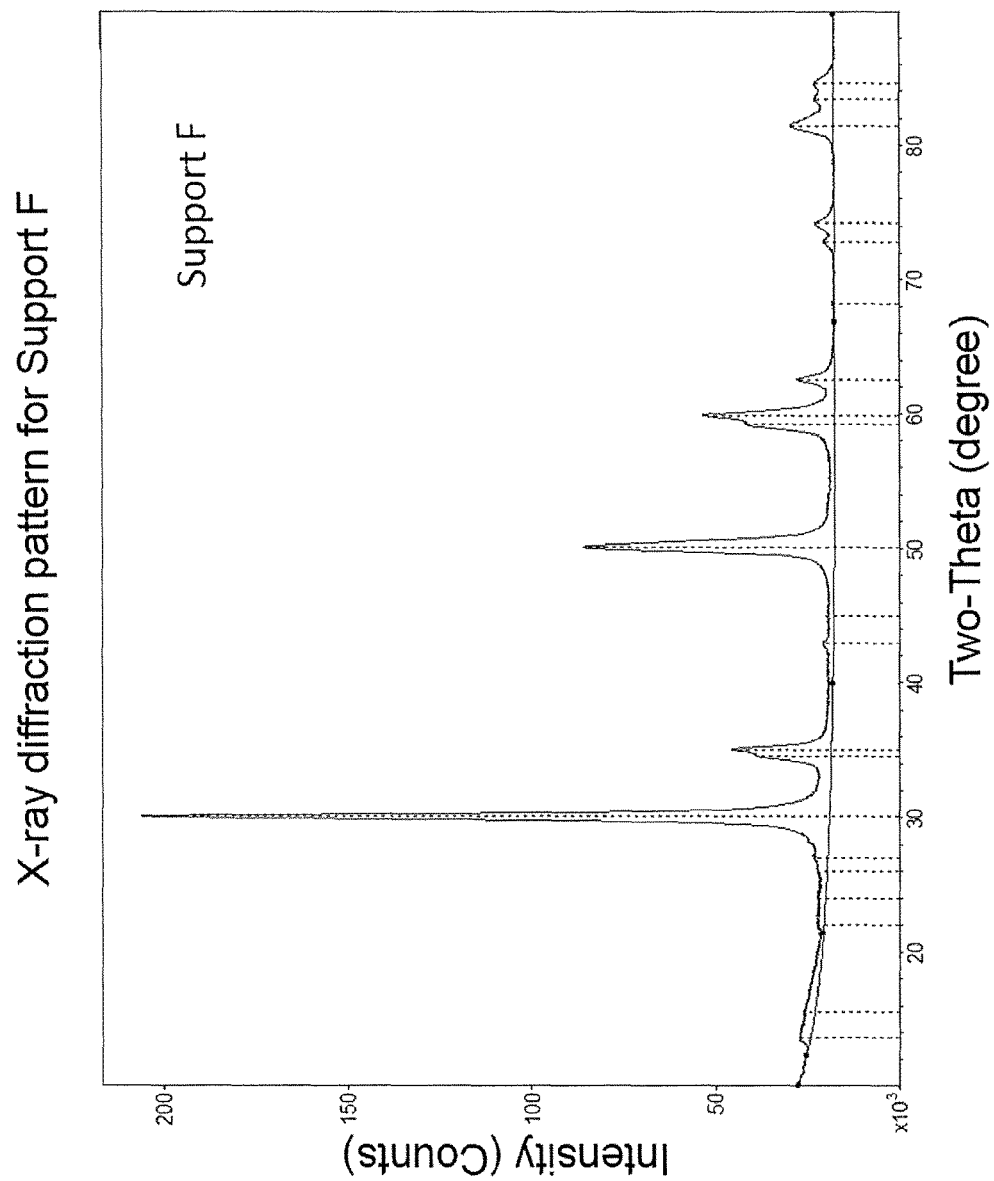
Figure 16:
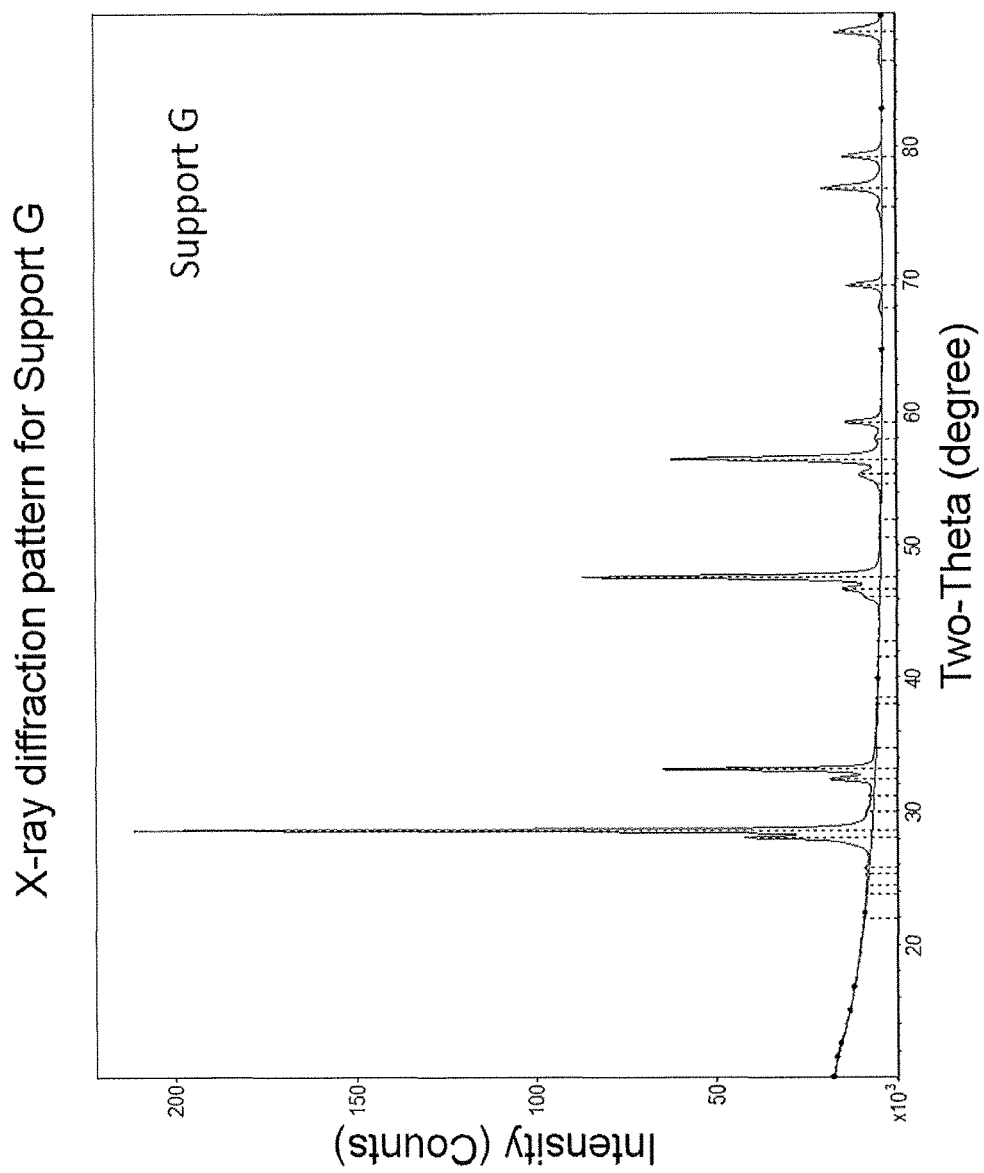
Figure 17:
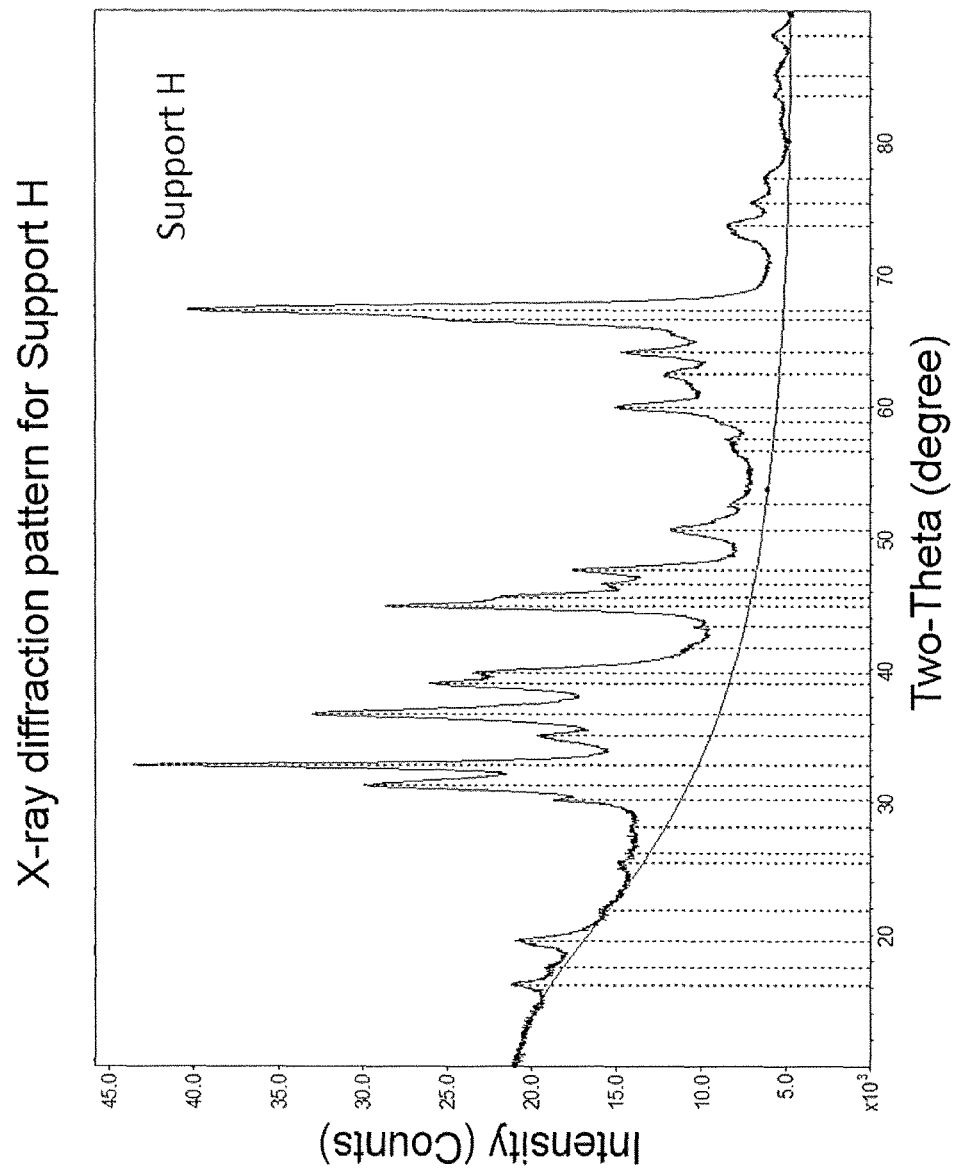

FIG. 9 shows the $N_2O$ conversion on 1% Pt catalysts. Support A is also the best support for 1% Pt with 52% $N_2O$ conversion at 200° C. The activity ranking of the 1% Pt catalysts follows Pt/A>Pt/B>Pt/D>Pt/C>Pt/E>Pt/G>Pt/F>Pt/H.

Example 5

Testing

Characterization of Rh Samples. X-ray Diffraction Data
1% Rh on Supports A to H (see Table 2) were characterized by X-Ray diffraction (XRD). FIGS. 10-17 provide XRD spectra of the samples of 1% Rh on Supports A to H. All samples were aged at 950° C. for 20 hours with an alternating lean (10 minute with air)/rich (10 minutes with forming gas) feed. The XRD spectra of Supports A through E show a single phase, cubic fluorite crystal structure. The lattice parameter $a_0$ as shown in Table 3 linearly decreases as the Ce content decreases. Support F (La doped $ZrO_2$), shows a tetragonal structure. Support G shows two separate cubic crystallite phases. Support H shows a mixture of alumina phases: $\theta$-$Al_2O_3$, $\delta$-$Al_2O_3$ and a trace of $\alpha$-$Al_2O_3$.

TABLE 3

Rare earth lattice parameters and crystallite size for Supports A to H

|  | $a_0$ (nm) | $c_0$ (nm) | Rare earth phase crystallite size (nm) |
|---|---|---|---|
| 1% Rh/A | 0.5410 |  | 30.4 |
| 1% Rh/B | 0.5354 |  | 9.5 |
| 1% Rh/C | 0.5278 |  | 8.4 |

TABLE 3-continued

Rare earth lattice parameters and crystallite size for Supports A to H

|  | $a_0$ (nm) | $c_0$ (nm) | Rare earth phase crystallite size (nm) |
|---|---|---|---|
| 1% Rh/D | 0.5229 |  | 8.9 |
| 1% Rh/E | 0.5169 |  | 9.5 |
| 1% Rh/F | 0.3618 | 0.5196 | 15.7 |
| 1% Rh/G | 0.5404[a] |  | 41.2[a] |
|  | 0.5506[b] |  | 26.4[b] |
| 1% Rh/H |  |  | * |

[a]Phase 1;
[b]Phase 2;
* = alumina

Example 6

Preparation Monolith $N_2O$ Catalyst

Sample 1 (Rh/$CeO_2$ powder) was deposited on a ceramic monolith substrate (600 cell/$in^2$) using a conventional washcoating process with Rh loading of 30 $g/ft^3$. This catalyst was aged at 750° C. for 20 hours with 10% $H_2O$ in air.

Example 7

Testing

Test of Monolithic Rh/$CeO_2$ Catalyst

Figure 18:
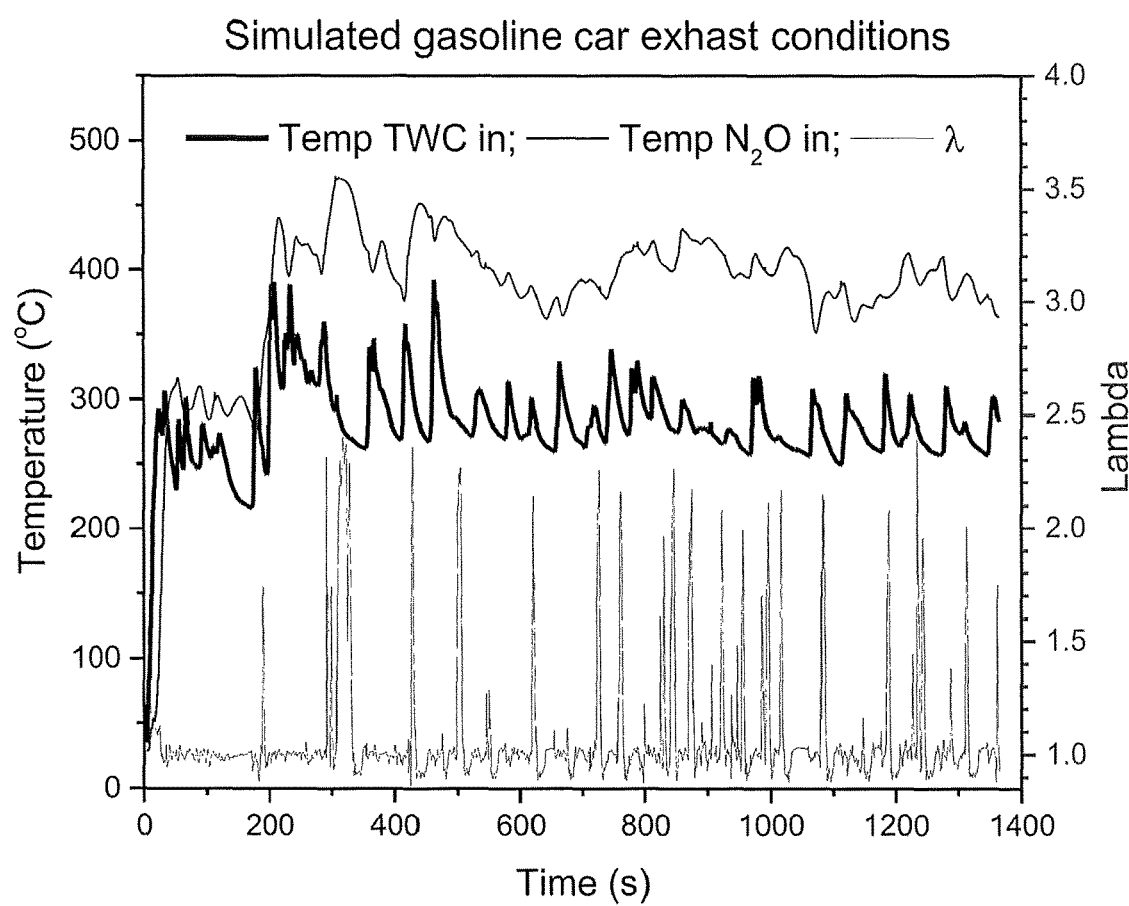
FIG. 18 shows transient traces of temperature (° C.) and A/F (lambda) versus time for simulated gasoline car engine operation and exhaust conditions.
Figure 19:
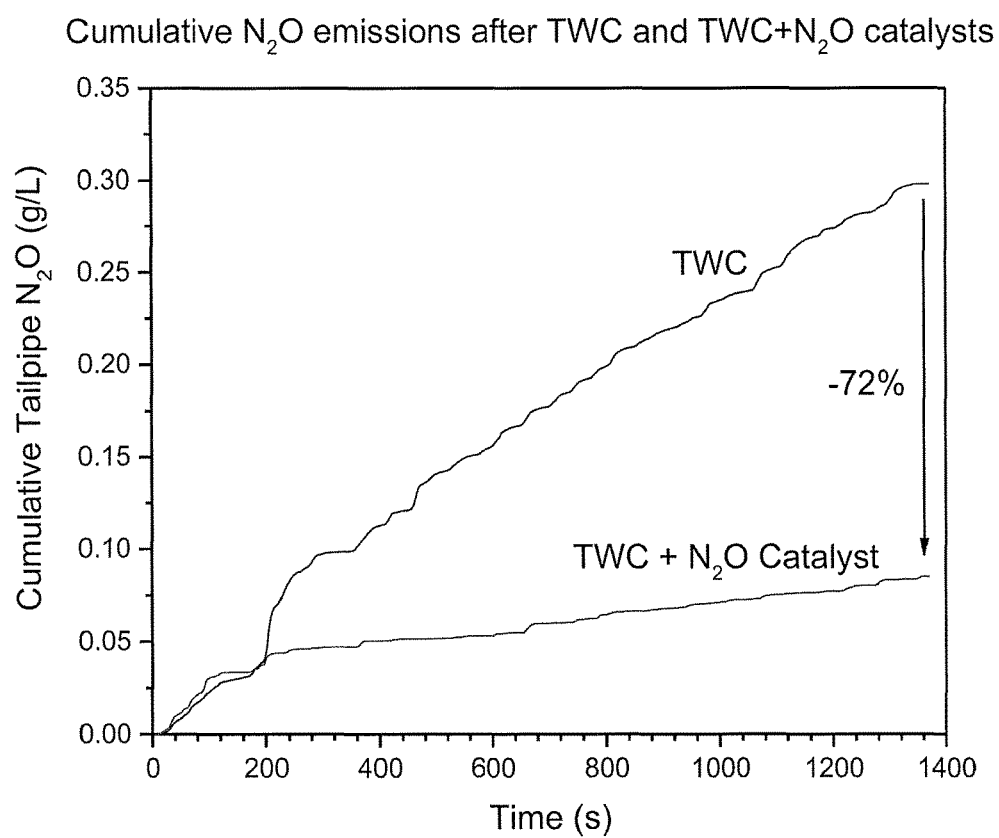
FIG. 19 shows a graph of cumulative N$_2$O emission versus time for an exemplary TWC+N$_2$O catalyst and a comparative TWC-only catalyst.

The monolith Rh/$CeO_2$ catalyst of Example 6 was tested with a lab reactor that simulates gasoline car exhaust. FIG. 18 shows the transient traces of the simulated engine operation and exhaust conditions. In this test, a three-way conversion (TWC) catalyst was used to generate $N_2O$ during the simulated engine test and placed before the $N_2O$ catalyst. $N_2O$ emission before and after the $N_2O$ catalyst was measured and used to calculate their respective cycle cumulative emissions. FIG. 19 shows cumulative $N_2O$ emission versus time. The cumulative $N_2O$ emission of 0.30 g/L catalyst after the TWC catalyst represents $N_2O$ formed across the TWC catalyst during the transient vehicle test, while the 0.084 g/L after the $N_2O$ catalyst represents 72% conversion of $N_2O$ over the monolith Rh/$CeO_2$ $N_2O$ destruction catalyst.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A nitrous oxide ($N_2O$) removal catalyst composite for treatment of an exhaust stream of an internal combustion engine operating under conditions that are stoichiometric or lean with periodic rich transient excursions, the catalyst composite comprising:
a $N_2O$ removal catalytic material on a carrier, the catalytic material comprising a platinum group metal (PGM) component supported on a ceria-containing support having a single phase, cubic fluorite crystal structure, wherein the $N_2O$ removal catalytic material is effective to decompose $N_2O$ in the exhaust stream to nitrogen ($N_2$) and oxygen ($O_2$) or to reduce $N_2O$ to $N_2$ and water ($H_2O$) or carbon dioxide ($CO_2$).

2. The $N_2O$ removal catalyst composite of claim 1, wherein the ceria-containing support has a pore volume of at least 0.20 cm$^3$/g.

3. The $N_2O$ removal catalyst composite of claim 1, wherein the ceria-containing support has a BET surface area of at least 10 m$^2$/g after aging at 950° C. for 20 hours with an alternating lean and rich feed.

4. The $N_2O$ removal catalyst composite of claim 3, wherein the BET surface area of the ceria-containing support is about 10 to about 100 m$^2$/g.

5. The $N_2O$ removal catalyst composite of claim 1, wherein the ceria-containing support has an X-ray diffraction (XRD) lattice parameter $a_0$ in the range of 0.517 to 0.541 nm.

6. The $N_2O$ removal catalyst composite of claim 1, wherein the ceria-containing support comprises a mixed metal oxide in solid solution form comprising ceria and one or more metal oxides selected from the group consisting of zirconia, praseodymia, lanthana, neodymia, yttria, samaria, and gadolinia.

7. The $N_2O$ removal catalyst composite of claim 6, wherein the mixed metal oxide comprise by weight:
ceria in an amount of about 5% to about 95%;
zirconia in an amount of about 5% to about 95%; and
one or more of praseodymia, lanthana, neodymia, yttria, samaria, and gadolinia in an amount of 0% to about 20%.

8. The $N_2O$ removal catalyst composite of claim 1, wherein the ceria-containing support comprises about 90 to about 100 weight % ceria and 0% to about 10 weight % of a promoter metal that is different from the PGM component.

9. The $N_2O$ removal catalyst composite of claim 1, wherein the PGM component comprises a rhodium component, a palladium component, a platinum component, or a combination thereof, wherein the PGM component is present on the ceria-containing support in an amount of about 0.01% to about 5% by weight of the ceria-containing support.

10. The $N_2O$ removal catalyst composite of claim 9, further comprising:
a promoter metal that is different from the PGM component in an amount of about 0.001% to about 10 weight % of the ceria-containing support, wherein the promoter metal comprises one or more base metals selected from the group consisting of copper (Cu), manganese (Mn), iron (Fe), cobalt (Co), nickel (Ni), vanadium (V), chromium (Cr), zinc (Zn), and tin (Sn); and
one or more additional PGM components selected from the group consisting of silver (Ag), iridium (Ir), gold (Au), and ruthenium (Ru).

11. The $N_2O$ removal catalyst composite of claim 9, further comprising:
one or more additional PGM components selected from the group consisting of silver (Ag), iridium (Ir), gold (Au), and ruthenium (Ru).

12. The $N_2O$ removal catalyst composite of claim 1, wherein the carrier comprises a flow-through substrate or a wall-flow filter.

13. An emissions treatment system for treatment of an exhaust stream of an internal combustion engine operating under conditions that are stoichiometric or lean with periodic rich transient excursions, the emission treatment system comprising:
an exhaust conduit in fluid communication with the internal combustion engine via an exhaust manifold;
a treatment catalyst; and
the $N_2O$ removal catalyst composite of claim 1.

14. The emissions treatment system of claim 13, wherein the treatment catalyst comprises a nitrogen oxides treatment catalyst, which comprises: a three-way conversion (TWC) catalyst, a lean NOx trap (LNT), or a selective catalytic reduction (SCR) catalyst.

15. The emissions treatment system of claim 13, wherein the treatment catalyst comprises a diesel oxidation catalyst (DOC).

16. The emissions treatment system of claim 13, wherein the $N_2O$ removal catalyst composite and the treatment catalyst are deposited on the carrier as separate layers or zones.

17. The emissions treatment system of claim 13, further comprising a second carrier on which the treatment catalyst is located.

18. A method for treating exhaust gases of an exhaust stream of an internal combustion engine operating under conditions that are perturbated stoichiometric or lean with periodic rich transient excursions comprising:
contacting the exhaust stream including hydrocarbons, carbon monoxide, and nitrogen oxides with the $N_2O$ removal catalyst composite of claim 1.

19. The method of claim 18, wherein the internal combustion engine operating conditions include reducing conditions for a first time duration followed by lean operating conditions for a second time duration, wherein the second time duration is at least twice as long than the first time duration, and wherein during the second time duration, the contacting step results in conversion of at least 90% of $N_2O$ in the exhaust gas stream.

20. The method of claim 18, wherein the $N_2O$ removal catalyst composite is at a temperature of about 200° C. to about 500° C.

21. The method of claim 19, wherein the $N_2O$ removal catalyst composite is at a temperature of about 200° C. to about 500° C.

22. The method of claim 20, wherein the contacting step is at a temperature of about 400° C. or below.

23. The method of claim 19, wherein the first duration is about 0.25 to about 30 seconds and the second duration is about 1 to about 30 minutes.

24. The method of claim 18, wherein the $N_2O$ removal catalyst composite is included in an exhaust gas treatment system comprising a lean NOx trap or a three-way conversion (TWC) catalyst, wherein the exhaust gas treatment system periodically requires rich conditions for nitrogen oxides (NOx) control.

25. The method of claim 18, wherein the $N_2O$ removal catalyst composite is included in an exhaust gas treatment system comprising a diesel oxidation catalyst optionally in combination with a selective catalytic reduction catalyst, wherein the internal combustion engine operating condition include periods of rich operation for $N_2O$ removal.

* * * * *